(12) United States Patent
Beaven

(10) Patent No.: US 8,095,413 B1
(45) Date of Patent: Jan. 10, 2012

(54) PROCESSING MANAGEMENT INFORMATION

(75) Inventor: Douglas F. Beaven, Cambridge, MA (US)

(73) Assignee: Virtualagility, Inc., Winchester, MA (US)

( * ) Notice: Subject to any disclaimer, the term of this patent is extended or adjusted under 35 U.S.C. 154(b) by 1397 days.

(21) Appl. No.: 09/312,740

(22) Filed: May 14, 1999

Related U.S. Application Data

(60) Provisional application No. 60/133,152, filed on May 7, 1999.

(51) Int. Cl.
*G06Q 90/00* (2006.01)
(52) U.S. Cl. ............... 705/7.38; 705/7.29; 705/7.36
(58) Field of Classification Search .......... 705/7, 9, 705/11, 7.38; 706/925, 934; 707/514; 434/107–108
See application file for complete search history.

(56) References Cited

U.S. PATENT DOCUMENTS

| | | | | |
|---|---|---|---|---|
| 5,406,477 A * | 4/1995 | Harhen | ............... | 703/6 |
| 5,530,861 A * | 6/1996 | Diamant et al. | ............... | 705/8 |
| 5,655,118 A * | 8/1997 | Heindel et al. | ............ | 707/103 R |
| 6,006,195 A * | 12/1999 | Marchak et al. | ............... | 705/9 |
| 6,067,548 A * | 5/2000 | Cheng | ............... | 707/103 R |
| 6,073,107 A * | 6/2000 | Minkiewicz et al. | ............. | 705/7 |
| 6,119,149 A * | 9/2000 | Notani | ............... | 709/205 |
| 6,292,830 B1 * | 9/2001 | Taylor et al. | ............... | 709/224 |
| 6,356,880 B1 * | 3/2002 | Goossens et al. | ............... | 705/30 |
| 6,442,557 B1 * | 8/2002 | Buteau et al. | ............... | 707/102 |
| 6,670,973 B1 * | 12/2003 | Hill et al. | ............... | 715/853 |
| 6,751,622 B1 * | 6/2004 | Puri et al. | ............... | 707/101 |
| 6,804,657 B1 * | 10/2004 | Sultan | ............... | 705/10 |
| 2001/0027455 A1 * | 10/2001 | Abulleil et al. | ............... | 707/102 |

OTHER PUBLICATIONS

Lowery, Gwen; Managing Projects with Microsoft Project 4.0: For Windows and Macintosh, version 4.0, Van Nostrand Reinhold, New York, 1994, HD69.P75 L694 1994.*
ManagePro 2.0 for Windows, version 2.0, Reference Manual, Avantos Performance Systems, Incorporated, 1993, HD70.M3 1993 v.2.*
Byers, Lloyd,; Strategic Management: Planning and Implementation, Concepts and Cases, Second Edition; Harper and Row, Publishers, Inc., New York; 1987.*
Kaplan et al.; The Balanced Scorecard—Measures That Drive Performance; Harvard Business Review, Jan./Feb. 92, vol. 70, issue1, p. 71, Harvard Business School Publication Corp.; 1992.*
Kaplan et al.; Using the Balanced Scorecard as a Strategic Management System; Harvard Business Review, Jan./Feb. 96, vol. 74, issue1, p. 75, Harvard Business School Publication Corp.; 1996.*
Pearce et al., Strategic Management; Formulation, Implementation, and Control, 4th Edition, Richard D. Irwin, Inc. 1991.*
Carter, a., As Program Management Function Evolve, Benefits Increase, Water Engineering & Management; Des Plaines, vol. 142, Issue 3, Mar. 1995, start p. 26 [ProQuest].*

(Continued)

*Primary Examiner* — Beth V Boswell
*Assistant Examiner* — Adrian McPhillip
(74) *Attorney, Agent, or Firm* — Dickinson Wright PLLC

(57) ABSTRACT

Management information is processed. A first set of computer data is acquired that represents a model of an organization of people having fundamental components, such as processes or capabilities, that are represented in the first set of computer data by data items. The first set of computer data is associated with a second set of computer data that represents a portfolio of management concepts, such as management goals. A report of management concepts is issued based on the second set of computer data and is sorted by fundamental component.

21 Claims, 40 Drawing Sheets

OTHER PUBLICATIONS

Board et al., High-end Project Managers, InfoWorld, Feb. 1, 1993, p. 61-69 [ProQuest].*
Zimmerman, Software Review-Open Plan 5.0 Upgrade, Cost Engineering, vol. 13, Issue 12, Dec. 1993, p. 11 [ProQuest].*
Prototyping a Project Master Data Base for Software Engineering Environments by Maria Penedo, Association for Computing Machinery, 1986.*
Web Based Agile Software Development by Mikio Aoyama, IEEE Software, Nov./Dec. 1998, p. 56-65.*
Balanced Scorecard Solutions.
Automating The Balanced Scorecard.
Dynacard Conceptual Framework.
Balanced Scorecard Benefits Executive Education.
Tools to Give the Executive Meaningful Information.
Organizer 97 GS—Key Benefits and Features.
Abstract—Five Steps to Ensure Project Success.
Five Steps to Ensure Project Success.
X-Pert Project Management Software.
Micro Planner Manager.
Renaissance Balanced Scorecard.
Janus Centre—What's New Q&A.
The Mindset Questionnaire.
The Agility Ouiz.
Interactive Tools.
Boeing 777.
NetScore.
Software Marketing Camp '98.
The Solution —IDenterprise.
IDpipeline.
IDprojectview.
IDthroughput.
IDactionflow.
IDpractices.
Frequently Asked Questions.
How to Build A Corporate Portal.
Tools Help Build Coporate Portals.
The Next Generation.
Portals Hit the Enterprise.
Home on the Web.
Editors' Choice-Excite.
Web Portals—Home on the Web.
Epicentric.
Epicentric—Overview.
Portera—ServicePört.
Plumtree takes root.
Verity and Yahoo! Inc. Sian Distribution Agreement.
Knoth, "Tools for Collaborative World", Computer-Aided Engineering: Apr. 1997.

* cited by examiner

RESEARCH BASED DIAGNOSTICS REDUCE
ORGANIZATIONAL BARRIERS

| ENTERPRISE | MANAGEMENT TEAM |
|---|---|
| • "HARD-WIRED" TO CUSTOMER NEEDS/BEHAVIORS<br>• INFECTIOUS, IMPROVEMENT-DRIVEN LEADERSHIP<br>• VISIONARY LEADERSHIP WITH CRYSTAL CLEAR COMMUNICATION<br>• EMPLOYEES ACT LIKE/TREATED LIKE OWNERS<br>• ACTION FOCUSED INNOVATION/RISK TAKING REWARDED<br>• VALUE BASED DECISION MAKING AT LOWEST LEVEL<br>• ADAPTIVE CULTURE, REVOLUTIONARY WHEN NECESSARY<br>• DRIVEN TO EXCEL; "GOOD ENOUGH NEVER IS"<br>• RELENTLESS COMMITMENT TO LOWER COST AND HIGHER QUALITY<br>• BOUNDARYLESS, BY WELL MANAGED STRUCTURES<br>• TIME/RESOURCES FOCUS ON HIGH VALUE INITIATIVES<br>• SYSTEMATIC, OPPORTUNISTIC STRATEGIES THAT ADAPT<br>• CONCENTRATE WHERE THE BUSINESS LEVERAGE IS<br>• EXACTING EXECUTION WITH RELIABLE RESULTS<br>• INFORMATION/KNOWLEDGE ACCESSIBLE AS NEEDED | • FOCUSING ON THE HIGHEST GAIN STRATEGIC INITIATIVES:<br>  - CREATING A PORTFOLIO OF HIGH LEVERAGE INITIATIVES<br>  - REPRIORITIZING THE PORTFOLIO AS THINGS CHANGE<br>  - REVIEWING NEW/OLD INITIATIVES FOR ROI IMPACT<br>• REDUCING ORGANIZATIONAL BARRIERS TO SUCCESS:<br>  - DETERMINING FACTORS CRITICAL FOR SUCCESS<br>  - IDENTIFYING KEY RISKS TO BE MANAGED PROACTIVELY<br>  - MAKING ADJUSTMENTS TO ELIMINATE KEY BARRIERS<br>• APPLYING MANAGEMENT TALENT ON THE RIGHT THINGS:<br>  - REINFORCING STRATEGIC GOALS USING STRUCTURED COMMUNICATION<br>  - GETTING SUBSTANCE FROM MANAGEMENT MEETINGS<br>  - FOCUSING MANAGEMENT ATTENTION ON THE HIGH LEVERAGE ITEMS<br>• EQUIPPING LEADERS TO SUCCEED:<br>  - LEARNING TO THINK LIKE OWNERS<br>  - GETTING THE MOST FROM INTERDISCIPLINARY TEAMS<br>  - MANAGING PROJECT RISK TO VALUE |

Fig. 5

| Values | | | | |
|---|---|---|---|---|
| Title | Business development assesment | | | Animation |
| Subtitle | current situation vs. desired state | | | Spin Rate |
| Show Average | | Top Value | Number of | 84 |
| 1 points | | 7 | 6 | Increment |
| Average | Value | Label | | 3 |
| 5 | 3 | business people vs. just sales people | | |
| 6.5 | 2.5 | sell solutions not just products | | OK |
| 7 | 4 | customer vs. internally focused | | Cancel |
| 6 | 3.5 | business makers vs. order takers | | Clear |
| 5 | 4 | profitability vs. sales focused | | |
| 6 | 4.5 | deal well at senior vs. just technical level | | |
| 5.5 | 4 | world class vs. unacceptable service | | |
| 7 | 3 | build value based client relationships | | |
| 0 | 0 | | | |
| 0 | 0 | | | |

Fig. 10

| Goals | | ▷ Plan | ▷ Administor |
|---|---|---|---|
| [Select] ▶ | | | |

View Contributing Goals      Show Columns for: Priority ▶

| Expand business with most profitable customers | Cost | Payback | Priority | Due |
|---|---|---|---|---|
| Deepen relationships with high net worth clients | 750,000 | 5,000,000 | 5 | 6w |
| Have profitable products for every segment | 75,000 | 250,000 | 5 | 33w |
| Top Goal Total: | $825,000.00 | $5,250,000.00 | | |

*Agile Manager*

Fig. 15

| | Cost | Payback | Priority | Due |
|---|---|---|---|---|
| View All Goals | | show Columns for: | Domain | |
| Environmental | | | | |
| New Goal | - | - | 5 | - |
| Competitors | | | | |
| Find new company or spin off threats | 5,000 | 50,000 | 5 | 10w |
| Monitor competitive moves around the Internet | 5,000 | 50,000 | 3 | 8w |
| Technical Innovation | | | | |
| new internet strategy | - | - | 5 | - |
| Customers | | | | |
| Expand business with most profitable customers | 125,000 | 16,750,000 | 5 | 17w |
| Increase visibility | - | - | 5 | - |
| Relationships | | | | |
| Ask clients about our perceived competencies | 10,000 | 500,000 | 5 | 1w |
| Deepen relationships with high net worth clients | 750,000 | 5,000,000 | 5 | 6w |
| Understand recent competitive wins | 1,000 | 10,000 | 5 | 4w |
| Products | | | | |
| Have profitable products for every segment | 75,000 | 250,000 | 5 | 34w |
| Resell our back office processing capabilities | 50,000 | 250,000 | 3 | 21w |
| Revisit our product pricing strategy | 20,000 | 1,500,000 | 5 | 6w |
| Services | | | | |
| Develop a web-based customer self service strategy | 450,000 | 2,800,000 | 4 | 21w |

Fig. 16

| Agile Manager I Hierarchy Listing - Netscape | | | | |
|---|---|---|---|---|

File Edit View Go Communicator Help

Bookmarks  Location  http://psdemo.cinteractive.com/agility0005/am/goals_sorted.jsp

Goals   ▷ Plan   ▷ Administor

[Select] ▼

View All Goals                                         show Columns for: Priority ▼

| | Cost | Payback | Priority | Due |
|---|---|---|---|---|
| Build an Internet savvy design and install team | 1,000,000 | 5,000,000 | 4 | -5w |
| increase auto adjudication rates | 1,000,000 | 1,250,000 | 5 | 86w |
| Deepen relationships with high net worth clients | 750,000 | 5,000,000 | 5 | 6w |
| Increase our technology R&D capability | 555,555 | 2,000,000 | 5 | 34w |
| Develop a web-based customer self service strategy | 450,000 | 2,800,000 | 4 | 21w |
| Implement highly scaleable and efficient processes | 450,000 | 1,250,000 | 5 | 30w |
| Select an E-commerce consulting firm | 300,000 | 1,000,000 | 4 | 4w |
| Achieve a 20% ROI | 250,000 | 1,250,000 | 5 | 34w |
| Develop an RFP for professional services support | 250,000 | 1,000,000 | 5 | -3w |
| Recruit and hire world class industry talent | 250,000 | 1,000,000 | 5 | 34w |
| Reduce product development cycle by 6 months | 250,000 | 500,000 | 4 | 17w |
| Implement GSTP by yearend | 150,000 | 10,000,000 | 5 | 34w |
| Expand business with most profitable customers | 125,000 | 16,750,000 | 5 | 17w |
| Implement self service technical help desk | 85,000 | 100,000 | 4 | 6w |
| Build a RFP/Proposal response capability | 75,000 | 100,000 | 4 | 8w |
| Have profitable products for every segment | 75,000 | 250,000 | 5 | 34w |
| Implement self service account maintenance | 65,000 | 2,000,000 | 4 | 1w |
| Resell our back office processing capabilities | 50,000 | 250,000 | 3 | 21w |
| Build a sales forecasting capability | 35,000 | 100,000 | 4 | 12w |
| Revisit our product pricing strategy | 20,000 | 1,500,000 | 5 | 6w |

Document Done

Fig. 17

| | Risk | Owner | Stage | Status | Due |
|---|---|---|---|---|---|
| ⊘ Have profitable products for every segment | 4 | Mike Jones | Requirements Gathering | needs attention | 33w |
| ⊘ Monitor competitive moves around the Internet | 3 | Doug Beaven | Analysis/Assessment | needs attention | 7w |
| ⊘ Reduce Breakeven on New Business | 4 | Doug Beaven | Implement | needs attention | 7w |
| ⊘ Develop an RFP for professional services support | 4 | Joe Smith | Retrospective | completed | -4w |
| ⊘ Perform reference checks on short list of PS firms | 4 | Doug Beaven | Retrospective | completed | -4w |
| O Ask clients about our perceived competencies | 5 | Doug Beaven | Requirements Gathering | not started | 1d |
| O Eclipse competition with our e-comm capability | 5 | Doug Beaven | | not started | |
| O Expand business with most profitable customers | 3 | Doug Beaven | Analysis/Assessment | not started | 16w |
| O Find new company or spin off threats | 5 | Doug Beaven | Implement | not started | 9w |

Fig. 20

| Goals | | | | | | |
|---|---|---|---|---|---|---|
| [Select] ▼ | | | | ▷ Plan | ▷ Administor | |
| [Select] | | | show Columns for: | | Status ▼ | |
| Hierarchy | | | | | | |
| Select Domain | | Risk | Owner | Stage | Status | Due |
| Top Goals | | | | | | |
| All Goals | lucts for | 4 | Mike Jones | Requirements Gathering | needs attention | 33w |
| Alerts | | | | | | |
| Search | | | | | | |
| New Goal | moves | 5 | Doug Beaven | Analysis/Assessment | needs attention | 7w |
| around the internet | | | | | | |
| ⊘ Reduce Breakeven on New Business | | 4 | Doug Beaven | Implement | needs attention | 7w |
| ⊘ Develop an RFP for professional services support | | 4 | Joe Smith | Retrospective Review | completed | -4w |
| ⊘ Perform reference checks on short list of PS firms | | 4 | Doug Beaven | Retrospective Review | completed | -4w |
| ○ Ask clients about our perceived competencies | | 5 | Doug Beaven | Requirements Gathering | not started | 1d |
| ○ Eclipse competition with our e-comm capability | | 5 | Doug Beaven | - | not started | - |
| ○ Expand business with most profitable customers | | 3 | Doug Beaven | Analysis/Assessment | not started | 16w |
| ○ Find new company or spin off threats | | 5 | Doug Beaven | Implement | not started | 9w |
| ○ Increase our technology R&D | | 5 | Joe Smith | Prototype | not started | 33w |

Fig. 21

| Goals | | | | |  |  | ▷ Administor |
|---|---|---|---|---|

[Select] ▼

| View Contributing Goals | | | | Show Columns for: Domain ▼ |
|---|---|---|---|---|
| Expand business with most profitable customers | Cost | Payback | Priority | Due |
| Customers | | | | |
| Relationships | | | | |
| Deepen relationships with high net worth clients | 750,000 | 5,000,000 | 5 | 6w |
| Products | | | | |
| Have profitable products for every segment | 75,000 | 250,000 | 5 | 33w |
| Top Goal Total: | $825,000.00 | $5,250,000.00 | | |

Agile Manager

Fig. 22

Agility
MANAGEMENT PARTNERS

EMPLOYEES ARE TREATED LIKE OWNERS

EMPLOYEES ARE TREATED LIKE AND COMPENSATED IN A MANNER REFLECTIVE OF OWNERSHIP RATHER THAN SERVITUDE.

"Employees [must] trust the company and believe changes are in their best interests." - Donald K. Clifford and Richard E. Cavanagh, *The Winning Performance*

|  | Strongly Disagree | Disagree | Slightly Disagree | Neutral | Slightly Agree | Agree | Strongly Agree | No Response |
|---|---|---|---|---|---|---|---|---|
| 1. Managers in this company respect the rights of employees and treat them with dignity and respect. | | o | o | o | o | o | o | o |
| 2. Job objectives are aligned with the overall corporate vision. | | o | o | o | o | o | o | o |
| 3. Performance information is shared with employees so they stay focused on results. | | o | o | o | o | o | o | o |
| 4. Compensation and reward structures are aligned with company and/or unit performace. | | o | o | o | o | o | o | o |

High Performance Traits
Relish change
Fight inertia
Clear strategy
Customer driven
Act like owners
Treated like owners
Reward risk taking
Fact based decisions
Value based decisions
Effective systems
Open to new ideas
Adapt
Process changes
Constant improvement
Fluid boundaries
Teamwork
Anti-bureaucracy
Know business drivers
Make alliances
Focused clearly
Industry trends & challenges
Basic Information
Feedback

Fig. 34

PROCESSING MANAGEMENT INFORMATION

CROSS-REFERENCE TO RELATED APPLICATIONS

This application claims the benefit of U.S. Provisional Application Ser. No. 60/133,152 entitled "PROCESS MANAGEMENT INFORMATION" filed on May 7, 1999, which is incorporated herein.

BACKGROUND OF THE INVENTION

Reputable authorities have documented industry's difficulty with successfully implementing either strategic plans or initiatives (e.g., reengineering: ⅔ fail; mergers: 57% fall short; IT projects: only 34% are implemented and take twice as long and twice as much money as projected). In addition, common frustrations of business executives around resulting from rapid rate of change can be paraphrased as follows:

"There's so much going on I can't get my arms around what it all means for improving the way we do business, and when I get close to a really important strategic initiative, particularly one affecting multiple aspects of the enterprise, it's usually in trouble."

As a result of today's shortening business cycles and global, dispersed organizations, a key competitive issue is how quickly an organization can successfully realign its people around initiatives to change the organization's business model or react to unforeseen circumstances or opportunities. Existing strategic planning and project management practices, which are actually or effectively separate processes, do not work quickly or effectively enough for a rapidly changing competitive environment:

Initiatives are proliferating in virtually every organization at an increasing rate due to technology shifts and, at any one time, are difficult to visualize or interpret strategically.

Local initiatives are often designed without a clear connection to overall corporate strategic goals and priorities, or with each other, so efforts can end up being at cross purposes or poorly coordinated.

Strategic thinking is not prevalent in the design of many initiatives which thus tend to perpetuate current practices more than find new ways to grow and prosper.

Existing management practices are often too informal and undisciplined to stay focused on key priorities or to keep abreast of changing circumstances.

Projects tend to be managed individually without strategic context so people working on teams do not understand how their actions contribute to the business.

Managers spend too much time administratively keeping "all the balls in the air" and too little time working proactively on substantive issues driving the business.

As a consequence of these problems, organizations find it more and more difficult to meet basic business expectations or to get crucial change initiatives accomplished. Organizations have difficulty translating outside events or new ideas into strategic plans and initiatives that get implemented. Today management needs a quick, cohesive general management process and tools designed for agility in the 21$^{st}$ century. There are examples of agility and high performance; in fact organizations across different industries have been held out as singularly successful and numerous studies have identified specific aspects—leadership, culture, customer relations, quality—that correlate with high growth and results.

The Web and Internet technology allow far-flung people to be linked and share information as never before, fostering new alliances and revolutionizing business. However, the tools developed so far are primarily intended to enable people to communicate at the individual and team level.

SUMMARY OF THE INVENTION

A single cohesive framework can be provided that embodies key elements for being agile (e.g. organizational development, leadership, project management, strategic planning) and that uses the Internet to make these elements readily available. Tools can be provided that help people understand business goals holistically and work in an integrated and agile way across the organization to accomplish common or shared goals. A common framework can be provided for communicating effectively across diverse groups. A common framework can be provided for assessing key elements of the business. The framework can also be used to access external sources of knowledge, expertise and tools.

As used herein, "organization of people" refers to any group of people, businesses, or other entities that are associated for one or more purposes. Typical organizations of people include a business, an industry group, a professional organization, a large corporation, a partnership, a customer allied with a supplier, a university, a division of a company, a government agency, and a political organization. As used herein, "management concept" refers to any product of a thought process by a person or other entity that is charged with a responsibility. Typical management concepts include goals, objectives, initiatives, ideas, plans, strategies, expectations, assessments, and targets. As used herein, "pointer" refers to any reference used to direct the attention of a person, computer program, or other entity. Typical pointers include hypertext links, pull-down menus, index entries, and textual directions.

In one aspect, the invention features a method for use in processing management information. The method includes acquiring a first set of computer data representing a model of an organization of people, the model having fundamental components, the first set of computer data including data items representing the fundamental components; associating the first set of computer data with a second set of computer data representing a portfolio of management concepts; and issuing a report of management concepts based on the second set of computer data, the report being sorted by fundamental component.

In another aspect, the invention features a method for use in processing management information for managing a customer relationship. The method includes acquiring a first set of computer data representing a model of the customer relationship, the model having fundamental components, the first set of computer data including data items representing the fundamental components; associating the first set of computer data with a second set of computer data representing a portfolio of management concepts; and issuing a customer management report of management concepts based on the second set of computer data, the customer management report being sorted by fundamental component.

Implementations of this or another aspect of the invention may include one or more of the following features. The fundamental components may include a customer component and at least one of the data items may represent the customer component and may include customer information for the customer relationship. The customer information may include a description of a customer segment, a customer product, or a customer service. The fundamental components may include a process component and at least one of the data items may represent the process component and may include process information for the customer relationship. The process information may describe a process to be executed by at least one person to advance the customer relationship, a process that includes identifying a customer need, a process that includes identifying an entity that is important to the customer relationship, a process that includes identifying a possible solution for a customer in the customer relationship, a process that includes identifying a benefit to a customer in the customer relationship, a process that includes striving to achieve sole source status with a customer in the customer relationship, a process that includes striving to achieve a customer confidant status with a customer in the customer relationship, or a process that includes striving to outperform a competitor in the customer relationship. The fundamental components may include a capabilities component and at least one of the data items may represents the capabilities component and may include capabilities information for the customer relationship. The capabilities information may describe a capability that is needed for meeting a client requirement, a capability that includes geographic coverage, a capability that includes a technical skill, a capability that includes providing a helpful partner, a capability that includes a relationship management skill, or a technology that is important to a customer. The fundamental components may include an economics component and at least one of the data items may represent the economics component and may include economics information for the customer relationship. The economics information may include a description of an economic potential of the customer relationship, a description of a profit and loss aspect of the customer relationship, or a description of an investments aspect of the customer relationship.

In another aspect, the invention features a method for use in processing management information for managing a program management office. The method includes acquiring a first set of computer data representing a model of the program management office, the model having fundamental components, the first set of computer data including data items representing the fundamental components; associating the first set of computer data with a second set of computer data representing a portfolio of management concepts; and issuing a program management report of management concepts based on the second set of computer data, the program management report being sorted by fundamental component.

Implementations of this or another aspect of the invention may include one or more of the following features. The fundamental components may include a customer component and at least one of the data items may represent the customer component and may include customer
information for the program management office. The customer information may includes a description of an internal customer, an external customer, a product, or a service. The fundamental components may include a process component and at least one of the data items may represent the process component and may include process information for the program management office. The process information may describe a process to be executed by at least one person to help meet a commitment to a customer, a process that includes identifying a customer need, a process that includes identifying an entity that is important, a prioritization process, a system delivery process, a process that includes an evaluation process, a process that includes a project management process, a process that includes performing a cost/benefit analysis, a process that includes an accountability process, a process that includes providing metrics, a process that includes providing reporting, a process that includes providing risk management, a process that includes a staffing process, a process that includes a training process, or a process that includes a decision making process. The fundamental components may include a capabilities component and at least one of the data items may represent the capabilities component and may include capabilities information for the program management office. The capabilities information may describe a capability that is needed for meeting a client requirement, a capability that includes business unit coverage, a capability that includes a technical skill, a capability that includes providing a helpful partner, a capability that includes a project management skill, or a capability that includes a technology that is important to a customer. The fundamental components may include an economics component and at least one of the data items may represent the economics component and may include economics information for the project management office. The economics information may include a description of expenses or a description of revenue.

In another aspect, the invention features a method for use in processing management information for managing a scalable process. The method includes acquiring a first set of computer data representing a model of the scalable process, the model having fundamental components, the first set of computer data including data items representing the fundamental components; associating the first set of computer data with a second set of computer data representing a portfolio of management concepts; and issuing a scalable process report of management concepts based on the second set of computer data, the scalable process report being sorted by fundamental component.

Implementations of this or another aspect of the invention may include one or more of the following features. The fundamental components may include a customer component and at least one of the data items may represent the customer component and may include customer information for the customer relationship. The customer information includes a description of a customer segment, a description of a customer product, or a description of a customer service. The fundamental components may include a process component and at least one of the data items may represent the process component and may include process information for the scalable process. The process information may describes a process to be executed by at least one person to deliver a consistent quality customer service, a process that includes identifying a customer need, a process that includes identifying an economic factor, a process that includes developing a scenario, a process that includes evaluating a competitor, a process that includes identifying a trend, a process that includes pilot testing an option, a process that includes managing an expectation, a process that includes assessing a system need, a process that includes assessing an organizational need, a process that includes assessing a management practice, a process that includes suggesting an improvement, a process that includes developing a change management process, a process that includes selling a customer on a change, a process that includes developing an action plan, or a process that includes maintaining a relationship. The fundamental components may include a capabilities component and at least one of the data items may represent the capabilities component and may include capabilities information for the scalable process. The capabilities information may describe a capability that is needed for meeting a client requirement, a capability that includes geographic coverage, a capability that includes a technical skill, a capability that includes providing a helpful partner, or a capability that includes a customer management skill. The fundamental components may include an economics component and at least one of the data items may represent the economics component and may include economics information for the scalable process. The economics information may include a description of a profit and loss aspect of the scalable process or a description of an investments aspect of the scalable process.

Other features and advantages will become apparent from the following description, including the drawings, and from the claims.

BRIEF DESCRIPTION OF THE DRAWINGS

FIGS. 3, 6-10, and 12-39 are illustrations of computer display screens produced by the software systems.

FIG. 5 is an illustration of principles underlying the software systems.

DETAILED DESCRIPTION

Figure 1:
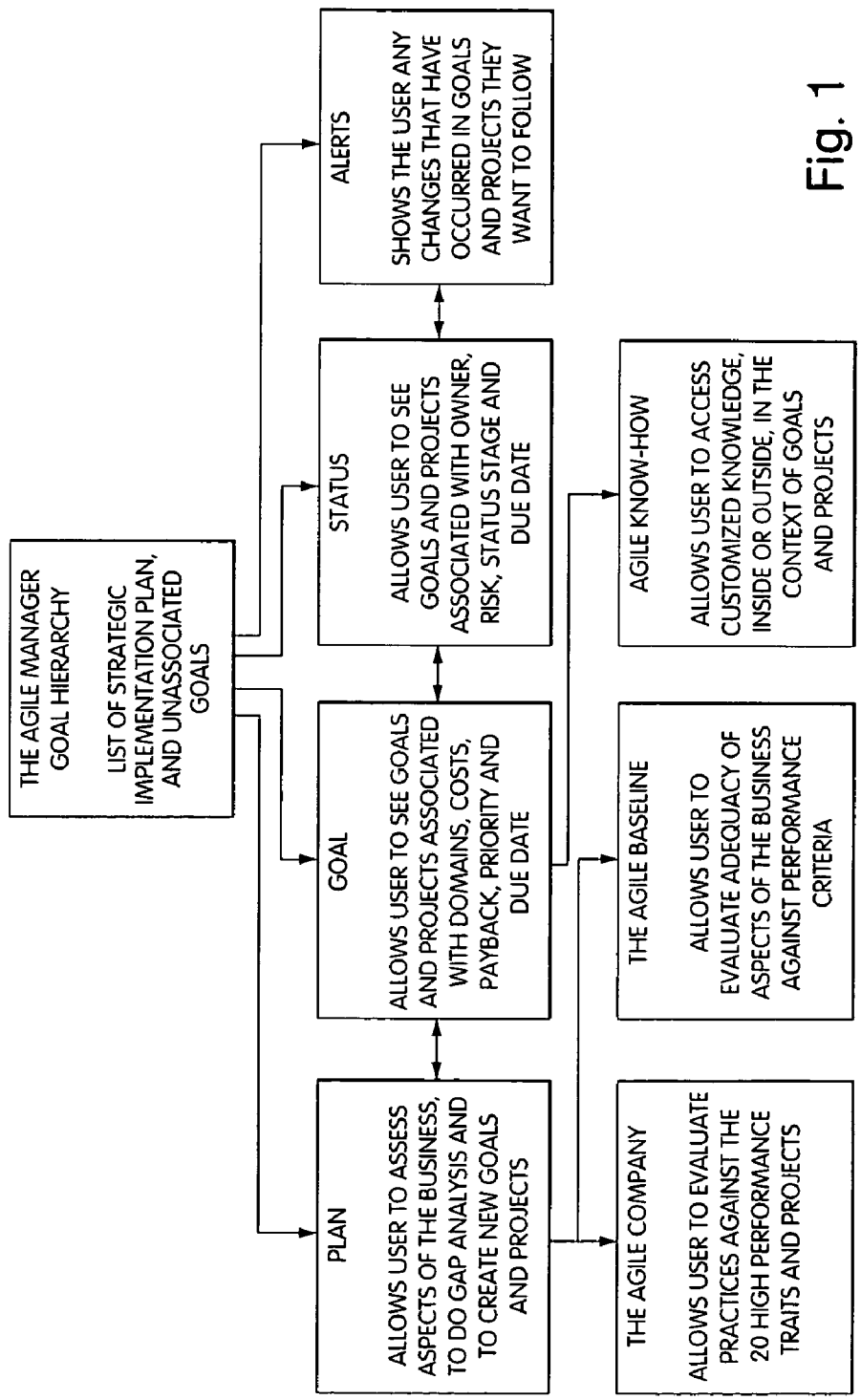
FIGS. 1-2 and 4 are block diagrams of software systems.

The Agile Management Portal program includes Intranet/Internet based software integrated in a process to help organizations such as companies, enterprises, and businesses, to be more agile. The program allows management teams, wherever located, to quickly plan, design, and work on a common portfolio of strategic goals and initiatives the teams believe will make the business grow and prosper, and to gain access to prepopulated external sources of knowledge, expertise and tools via the Internet.

Agility management: In at least some circumstances, Agility means being able to consistently grow and perform better than competitors in the marketplace over time, and Agility management means linking strategic planning, project management, and high performance organizational principles into an integrated set of management tools, templates and services that enable organizations to be more agile.

The Agile Manager can serve as a "management portal" through which people can view both internal organizational goals and external information available to help achieve these goals. The Portal's functional architecture is called The Agile Manager, and has four modules, the Agile Manager, the Agile Company, the Agile Baseline, and Agile Know-how, that can be used in a planning and management process:

The Agile Manager includes:

(1) a business domain structure to which strategic goals and contributing initiatives can be linked. This structure creates a stem-to-stern view of how the business works, including customer, value chain, organization and economic domains. This structure allows the user to enter and subsequently explore strategic goals and initiatives germane to either the organization as a whole or to a particular domain. Once the user picks an area of interest, the user is effectively "one click" away from several context sensitive views about investments the organization is making to grow and improve performance.

(2) a gap analysis facility that a management team can use to assess performance gaps and to design how any aspect of the domain structure would have to change to close these gaps.

(3) the ability to create a portfolio of strategic goals and their contributing initiatives using either top down brainstorming or bottom-up association techniques. As a result, teams can effectively start with a clean sheet of paper and reinvent the business from scratch. Or the teams can review an inventory of already on-going activities and relate these activities to each other and to overall strategic goals. Having this portfolio available on-line—subject to permissioning controls—for all to see, keeps members of the organization aware of where they need to go, what it will take to get there, and what actions should be taken to stay on track.

(4) a facility to draw people's attention immediately to changes in the portfolio and its contents that are important to the people in view of their particular roles or interests. This facility gives various common and individualized views of different goals and initiatives that will help diverse groups of people to work together effectively. A history of these changes and related dates is also maintained.

(5) a common attribute structure that provides information (e.g., costs, payback, priority, risks, due dates) for any goal and contributing initiative so the goals and initiatives can be sorted against a piece of information to facilitate ongoing decision making. For example, if resources are limited, the user can sort initiatives by cost, payback, and priority, or if the user wants to see how the portfolio will affect any part of the organization, the user can sort by domain.

(6) the ability to follow a context sensitive link to any goal or initiative and its relevant internal and external sources of knowledge deemed helpful to successful implementation.

(7) a management action plan/agenda utility that managers can use to keep track of pending issues and actions for each strategic goal or initiative. As a result, users can learn about outstanding issues, upcoming agenda items, and the responsible parties. As a result, items are easily found and a user is allowed to see progress related issues before meetings so that less time is need to focus management meetings on substantive issues.

The Agile Company:

(8) The Agile Manager also supports the Agile Company program, which includes content that executives can use to assess how well their organization matches high performance criteria and to suggest base-case template programs that can be adapted to accelerate developing agility. Behind the Agile Company is content reflecting 20 traits and characteristics that capture fundamental principles underlying agile, high performing organizations The Agile Baseline:

(9) The Agile Baseline includes an accessible assessment tool that displays performance criteria that respondents then evaluate in terms of their organization's competency relative to each criterion. The result of this input is displayed as a "spider" diagram that visually helps to convey the extent of any gaps that should be closed to improve competitiveness. The spider diagram helps people focus on opportunities for improvement and makes the rationale for change readily accessible to members of the organization.

Agile Know-how

(10) Agile Know-how includes a subscription service that provides links to specific knowledge sources and tools that can be helpful to people working on different initiatives. This subscription service fits together with the Agile Manager so the knowledge is accessible in the context in which it is needed.

When the Agile Manager and its modules are used in conjunction with the Agility Management Process, people are better able to work together in a way demonstrated to be correlated with high performance:

Fosters a more adaptive culture (e.g., to relish change and fight inertia): linking goals, projects and their attributes and being able to sort the portfolio to focus on a particular aspect facilitates adapting to changes when they occur Helps align users behind strategic goals and contributing projects: getting users to "see" in simple outline form where the organization wants to go to grow and prosper, and what it's going to take to get there, which enables users to understand the strategy and to keep their own projects in alignment Helps employees act and be treated like owners: when people can see a model of the organization and understand how it works they are better able to make decisions about what is important, much as if they owned the organization Helps makes decisions based on benefits and risks to the business: linking proposed initiatives to the model of the organization, and to costs, paybacks, and priorities makes it easier to understand the benefits and risks that could result.

Provides well managed structure that encourages teamwork across boundaries: the ability to understand and be informed of changes elsewhere in the organization enhances the ability to work across different disciplines and locations Encourages people to continuously look for ways to improve the business: enabling management team members to review a table of contents of their business, and to assess gaps between how good they need to be and where they are currently, and to set goals for closing these gaps; this ability of individuals or teams to step back and to "see" the table of contents and to reflect on what changes need to be made to be different in the marketplace and to improve performance is a key ingredient in creating a culture that continually looks for ways to improve the business Helps people understand better how the pieces of the business work together: the model of the business gives viewers an integrated view of how the business works and how they relate, which provides a valuable context for understanding why something that does not entirely make sense locally could be proper for the business as a whole Keeps users focused on successfully implementing strategic priorities: The ability to constantly view and be aware of what is in the approved strategic goals and initiatives portfolio keeps members of the organization aligned around common strategic priorities Makes the management process more cost effective by having information and knowledge available when it is needed: the linking of plans, goals, resources, people and projects into a relational database accessible via the Internet makes valuable information available almost immediately The Computing Environment To use Agility Manager effectively, an organization may use an intranet with widespread email and Web browser usage. Agility Manager is compatible with modern email systems and with Microsoft and Netscape Web browsers. Typically, no other client-side software is required.

Agility Manager combines sophisticated application code with powerful, industry standard server components. The Agility Manager server includes a database server, a Web application server, and application code written in server-side Java. Agility Manager can use a Microsoft or Oracle database server. For example, Agility Manager may be run on an IBM Websphere application server, or may run on other Java-based application servers. The Agility Manager may run on Windows NT or Solaris or other operating environments.

Agility Manager may be installed on an internal server, or may be hosted on a server such as a Web server and connected via Internet or Virtual Private Net.

Example of an on-site installation:

| | |
|---|---|
| Browsers: | MS Internet Explorer 3+, Netscape Navigator/Communicator 3+ |
| Mailers: | Email client with click-through URL linking, such as Notes, Outlook, Outlook Express, Eudora, Communicator. |
| Server OS: | Windows NT 4 Solaris 2.5+ |
| Database Server: | MS SQL 6.5 Oracle 8 Database administration capability is typically required. |
| Application Server: | IBM WebSphere 1.1 or 2.0 |
| Web Server: | MS IIS, Apache, or Netscape |
| Mail System: | SMTP compatible, such as Notes, Exchange, Sendmail, Smail, Postoffice. |

Example of an off-site installation:

| | |
|---|---|
| Browsers: | MS Internet Explorer 3+, Netscape Navigator/Communicator 3+ |
| Mailers: | Email client with click-through URL linking, such as Notes, Outlook, Outlook Express, Eudora, Communicator. |

Integration and Source Code

The Agile Manager is based on a relational data model.

Screen Map for Agile Manager

FIG. 1 is a map of the basic structure of the suite of software that shows key functions performed by the Agile Manager and ways in which users can get access to other modules of the suite. The sequence of the map illustrates logical paths users take as different aspects of the goal hierarchy are considered, from deciding what belongs and why, designing and modifying goals and contributing projects, monitoring and pursuing issues related to implementation progress, and getting to specific knowledge found helpful to the context of any particular initiative. A screen by screen description is provided below.

Overview of Corporate Processes Affected by the Agility Management Program

The Agility Management Program helps leaders, managers, and staff conduct normal management practices in everyday corporate life while quickly and effectively using the power of the Internet to gain access to knowledge needed to make decisions. Thus, the program helps leaders and managers to execute daily operations successfully, to continually improve the way they do business, to keep abreast of changing competitive conditions, and to deliver increasing value to their customers and owners.

The Planning/Execution Cycle (Process)

Technology is transforming virtually every aspect of commerce, and globalization and deregulation are making competition more complex. These forces are causing organizations to go through planning and execution cycles to launch multiple new initiatives to cope. To do this, organizations routinely make assessments of their performance—they consider best practices, they survey customer opinions, they examine market and competitive trends and practices; they create task forces and hire consultants who generate findings and conclusions. To handle these conclusions, organizations conduct planning to establish goals and design initiatives to improve their performance, they hold retreats to develop these visions, and they decide on priorities and allocate resources to fund initiatives to bring these visions to fruition. To execute these initiatives, organizations assign staff and hire outside expertise and know-how to get the results they want. To get the results to stick, organizations undertake change management programs to bring people and organizational behaviors into line with what the new initiatives require.

Figure 2:
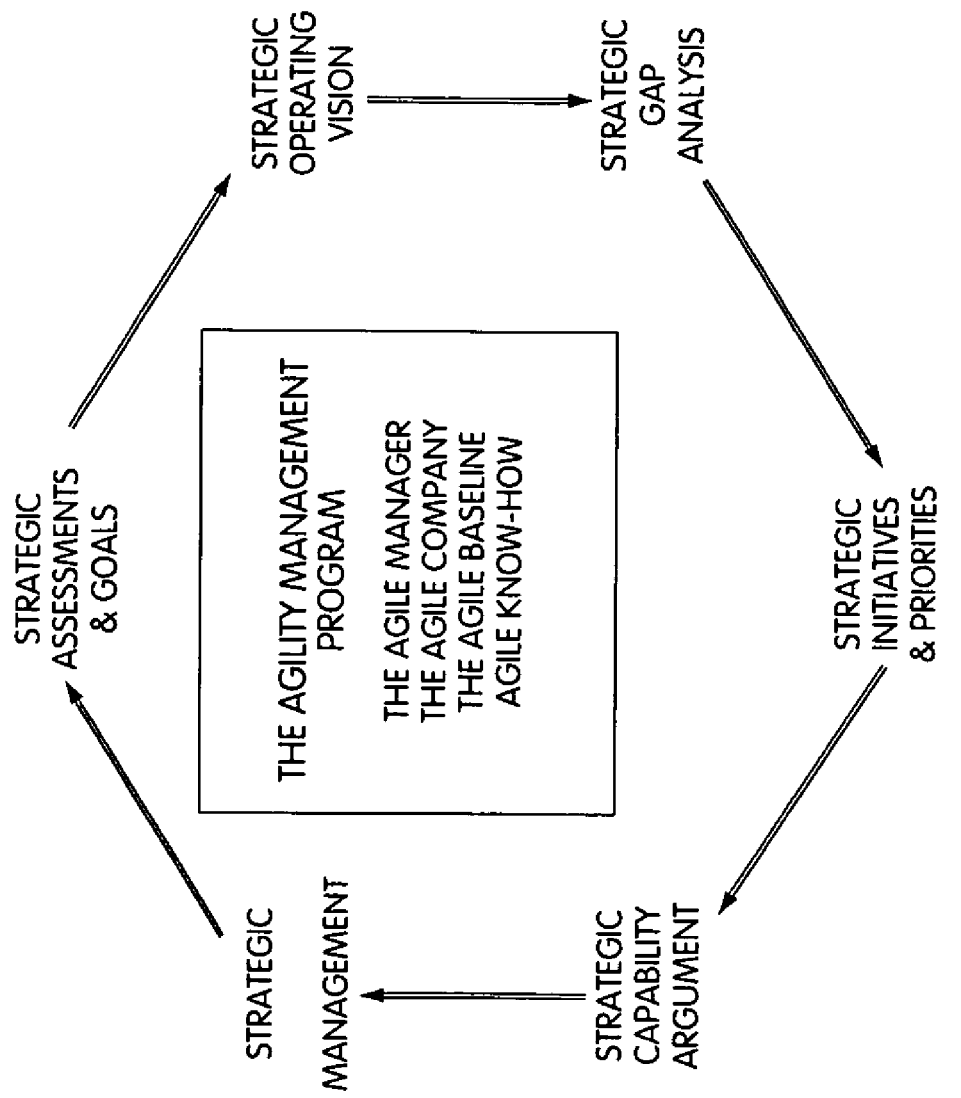

The Agility Management Program's software enables people to get organized and communicate much easier and faster as they go through these planning and execution cycles and to gain access to knowledge and tools that will help them understand how to implement their initiatives more successfully. FIG. 2 illustrates the relationship between the Agile Manager and common planning practices.

Managing a Portfolio of Initiatives

The planning/execution process is repeated again and again across organizations in different departments, functional areas, and lines of business. It is not uncommon for literally hundreds of initiatives to be underway in units across an organization. Some of the initiatives are local initiatives to improve a specific operation and typically do not need to be coordinated with other initiatives. Many initiatives, however, have multiple components that should be coordinated so that they contribute to the accomplishment of a single overarching goal. For instance, a new product requires that processes across the organization from sales and marketing through operations and manufacturing and technology to human resources be integrated and aligned so that the product will be introduced in time to exploit an opportunity in the marketplace. Similarly, introduction of new technology, such as a new workstation, often requires coordination of units from information technology, sales and marketing, human resource training, and administration before the new technology can be put into beneficial use.

Figure 3:
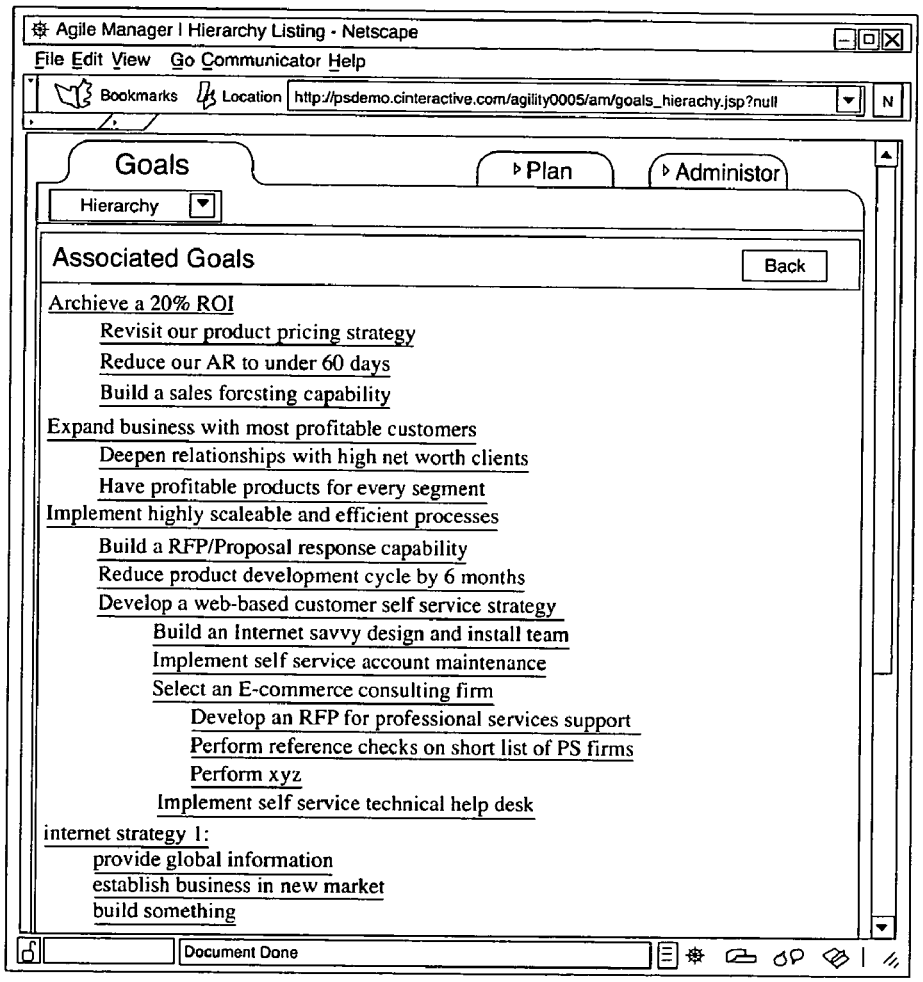

The Agile Manager not only facilitates the planning/execution cycle for 20 any particular goal or initiative, but also allows the user to put all the priority goals and each priority goal's contributing initiatives into a strategic implementation portfolio or hierarchy (FIG. 3.).

The portfolio view relates contributing initiatives or projects to their overarching goals and to each other, and allows the user to sort these initiatives, projects, or goals in a variety of ways. For example, the user can sort the initiatives in terms of their impact on the domain structure of the organization, by strategic factors such as cost, payback, and priority, or according to the status and stage the goals and initiatives are in to allow better management.

Helping Leaders, Managers, and Staff Play their Different Roles

Figure 4:
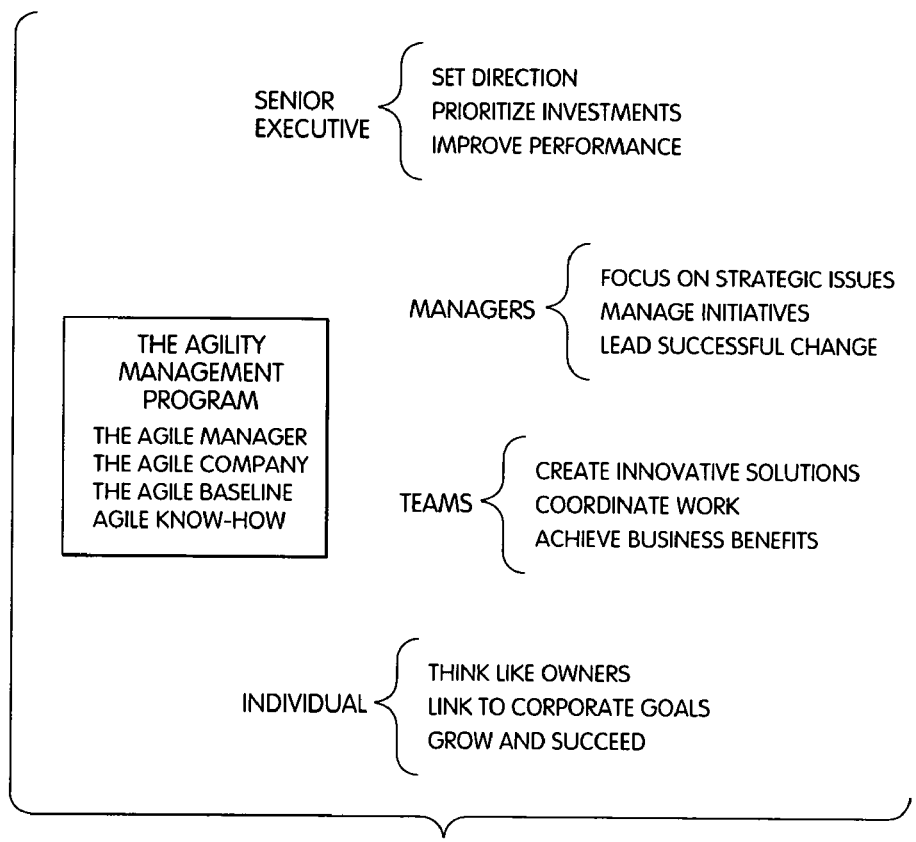

People throughout an organization have distinct roles to play in the formulation and implementation of plans. Traditionally, these roles have been substantially formalized, with senior levels likely to do the planning and lower levels likely to do the implementation. Modern email and voice communication have flattened organizational structures by allowing ordinary employees to get access to information on their own without depending on senior levels as the source of knowledge. The Agile Manager allows effectively everyone to see the goals and projects important to the company and, as shown on FIG. 4, helps people to play specific roles with a clear picture of the initiatives involved and allows people to contribute ideas.

Overview of how the Software Integrates with a Process in the Agility Management Program As shown in FIG. 5, the Agility Management Program reflects principles of effective management of high performing organizations.

The following describes a typical sequence of how a management user/team might use the Agile Manager. The particular example is drawn from an actual implementation of the Agile Manager linking strategic corporate goals and Information Technology initiatives. The Agile Manager structure allows many different business applications, and a key problem it helps solve is bridging a communication gap between business users and their technical counterparts so both sides work off the same page.

Figure 6:
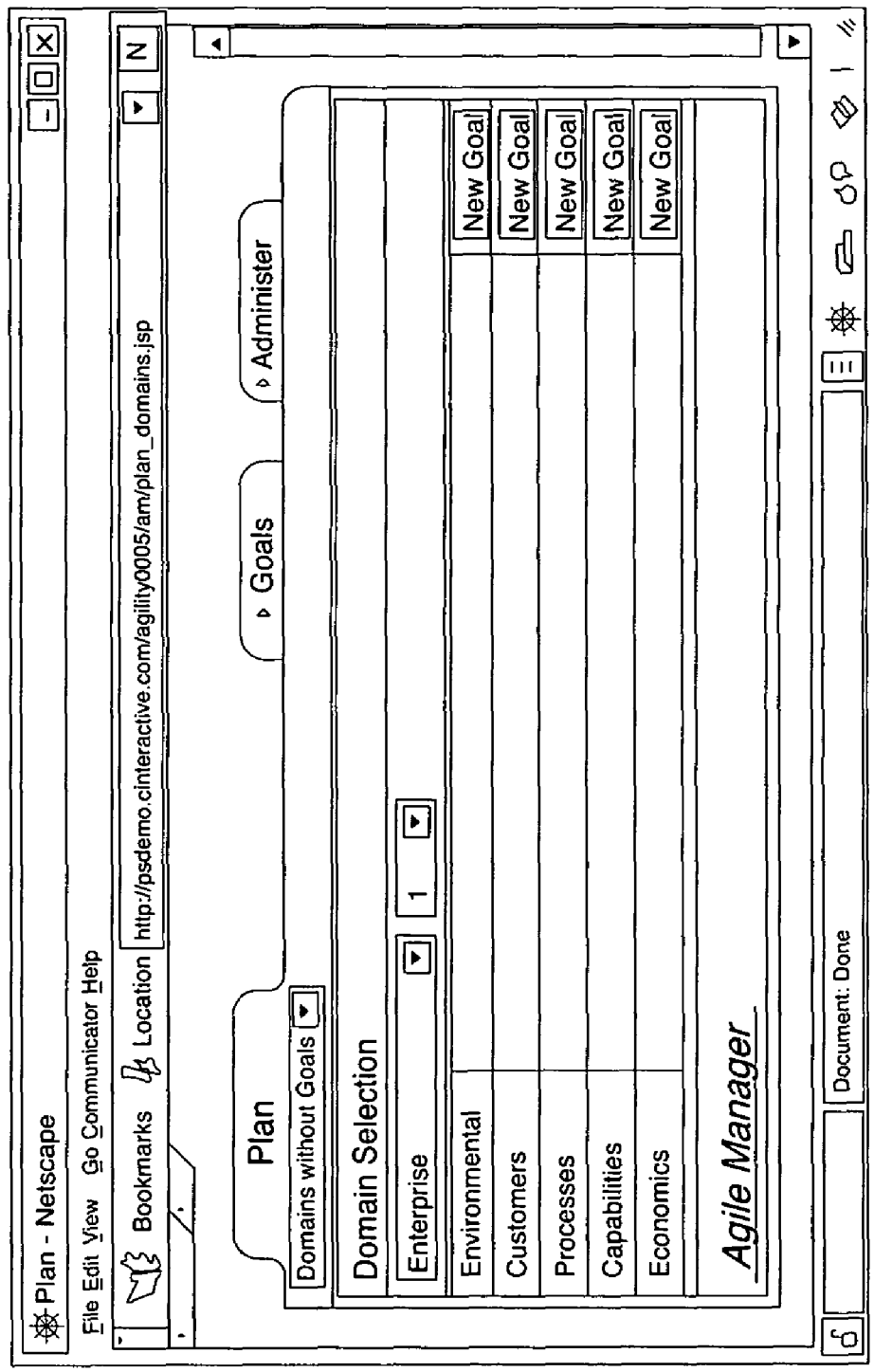
Figure 7:
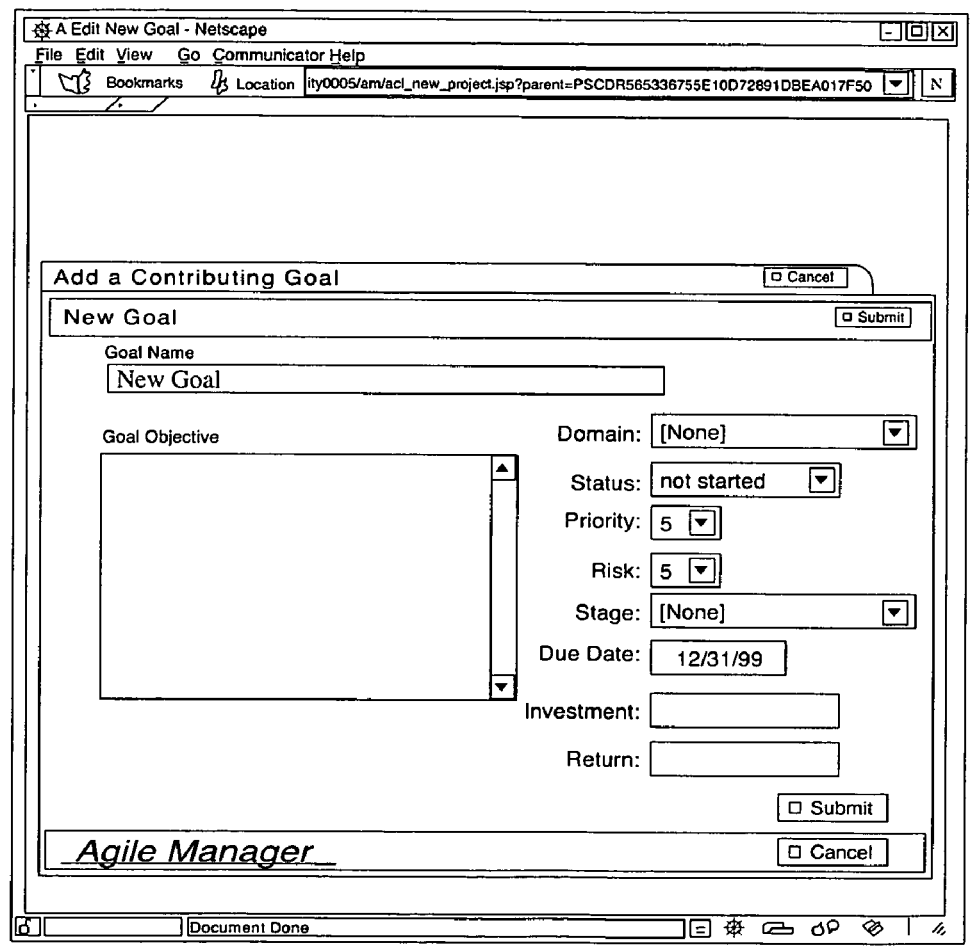
Figure 8:
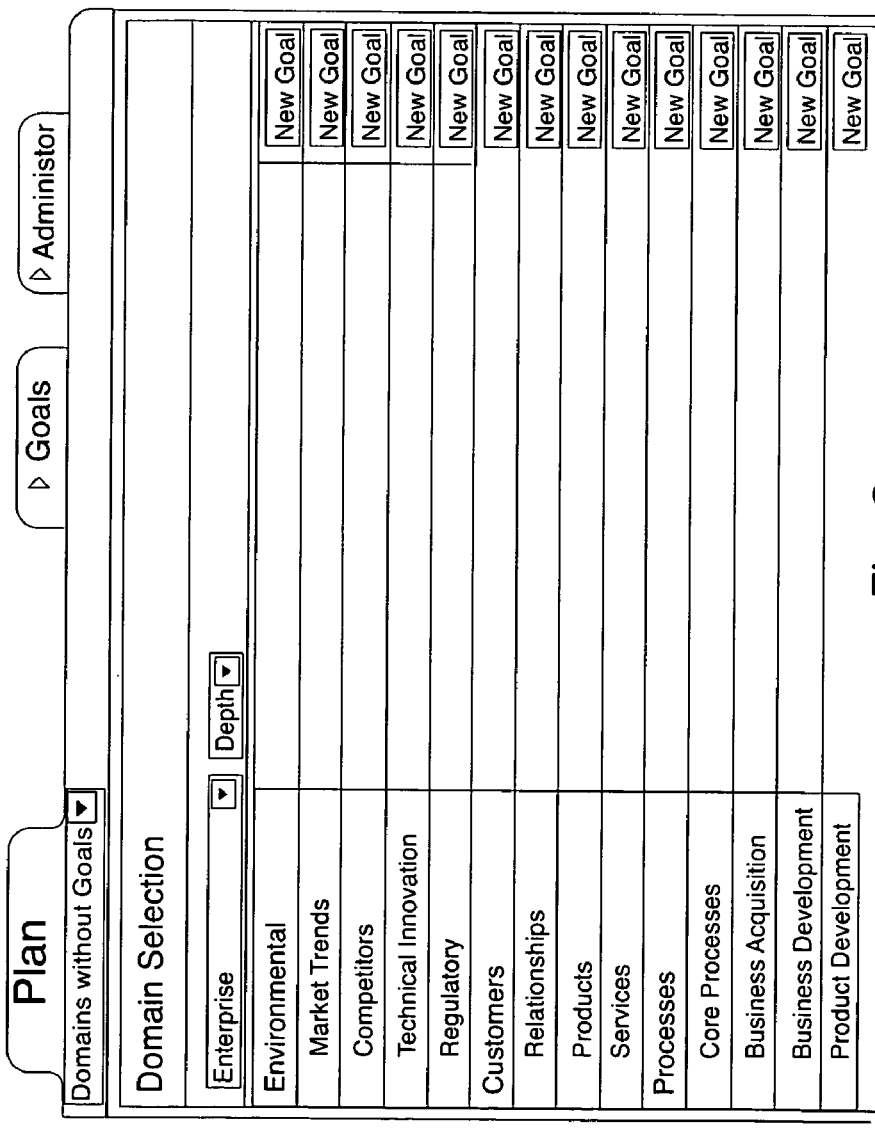
Figure 9:
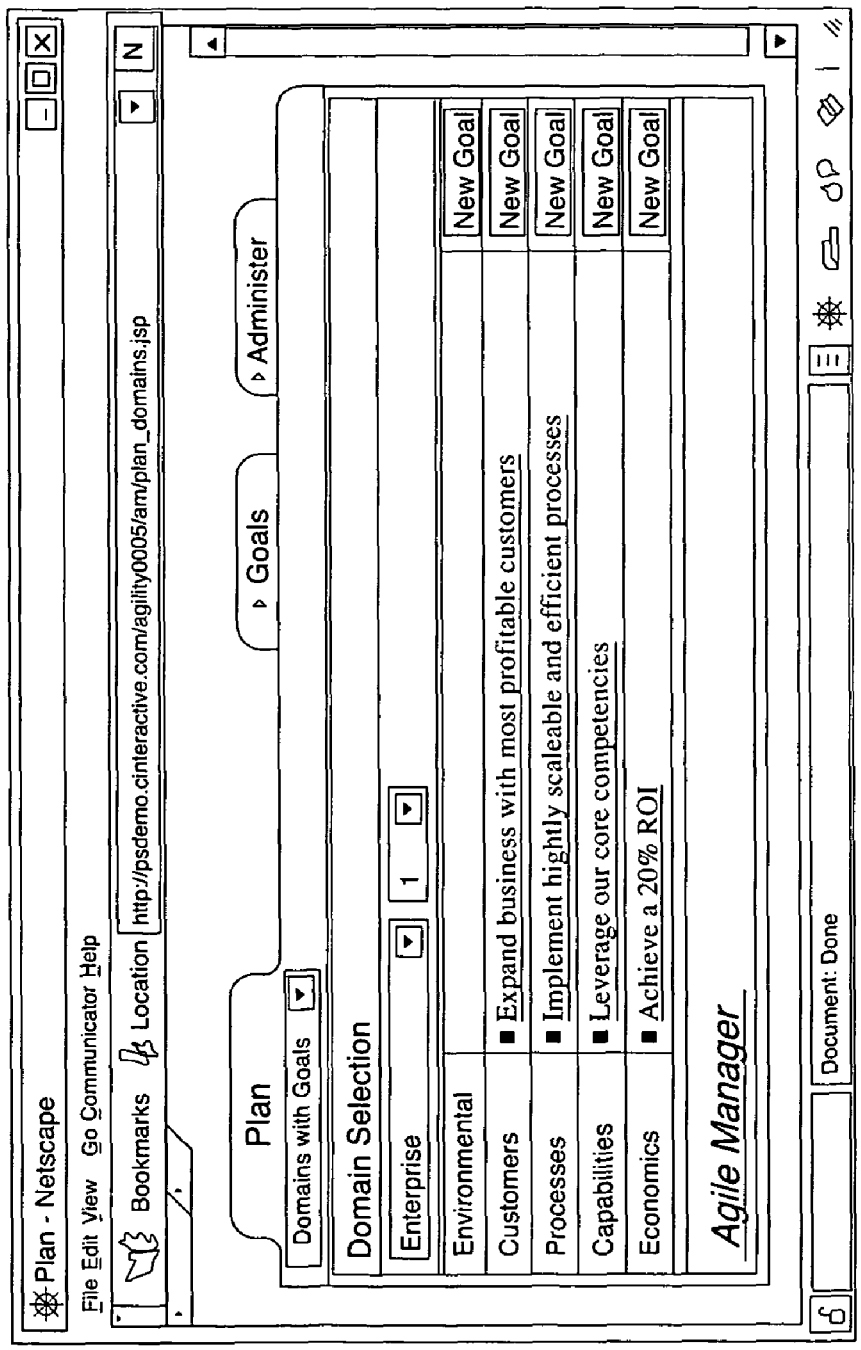

Planning:

The first sequence, for planning, starts with users viewing their domain structure (FIG. 6) and deciding where they want to set a new goal (see FIG. 7). Users can view the domain structure at different levels of depth from the highest level (shown in FIG. 6) to lower levels showing sub-components within each domain (see FIG. 8). If they wish, users can display already existing goals (see FIG. 9), which helps them to understand what's in the current hierarchy, which can help address issues such as whether particular domains are sufficiently active and whether some existing goals may no longer be appropriate.

Figure 11:
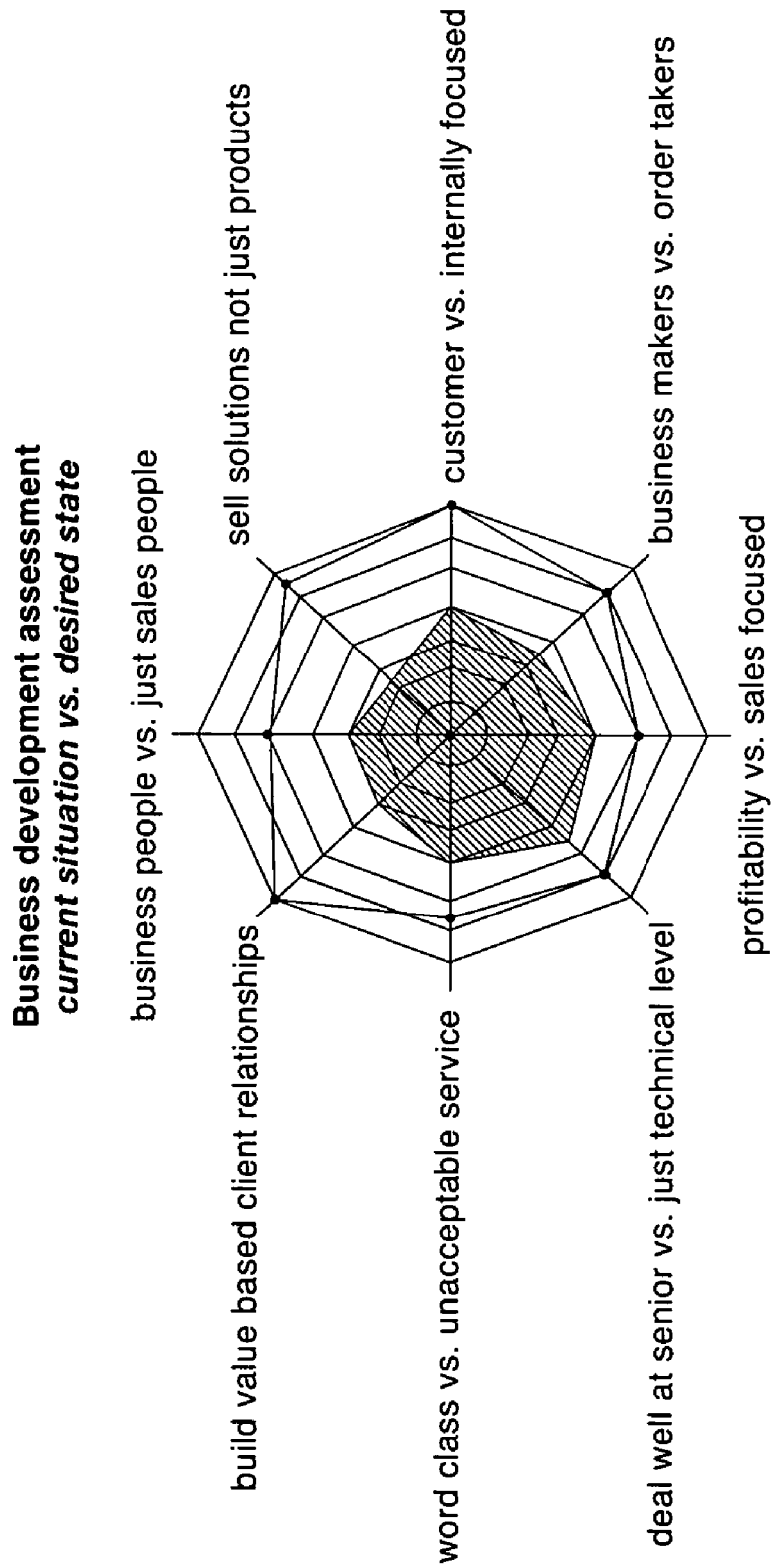
FIG. 11 is a spider diagram produced by the software systems.

Once users have reviewed current activity and debated where the company needs to devote attention to improve future performance, they can select any domain and select an Agile Baseline Mode ("Baseline"). Baseline allows users to critique the selected domain in terms of criteria that The Agile Manager suggests (see FIG. 10), or that they provide or modify themselves. Once the users have agreed on the criteria and reached consensus about both how good the criteria need to be and how good the criteria currently are, the results are displayed in a spider diagram (see FIG. 11). The spider diagram helps to capture the users' assessment of the current situation and to explain why the domain has been selected for developing new goals to be included in the hierarchy. Subsequently, users can return to Baseline to reassess whether improvement goals and projects that have been undertaken have in fact been successful. This reassessment can suggest new gap areas where new initiatives may be appropriate, or indicate that not enough has been accomplished to sufficiently improve the situation.

After exercising Baseline, users may establish a new goal (by a "new goal" button on the domain screens) (see FIG. 7 for the screen that appears when the button is pushed) to improve performance. Once established, the new goal takes its place in the goal hierarchy and management can decide what should happen next.

For example, even if a goal "expand business with the most profitable customers" has been entered, ideas related to the goal have not been entirely fleshed out, resources have not been allocated, plans have not been formulated, and accountability has not been assigned. The goal is without projects necessary to bring about the desired results. To begin to put these projects together, users can use the gap analysis feature to view each domain and sub-domain in terms of how each domain or sub-domain would have to change if the goal is to be achieved. As users identify these changes, they create in effect a vision of a different company that would achieve the goal (see FIG. 12). In this example, two projects or goals to expand business with profitable customers are: to deepen relationships with high net worth clients, and to have profitable products for every segment. Each of these two projects or goals may also in turn be analyzed in the gap analysis process to create other projects or goals that will make them a reality.

Figure 13:
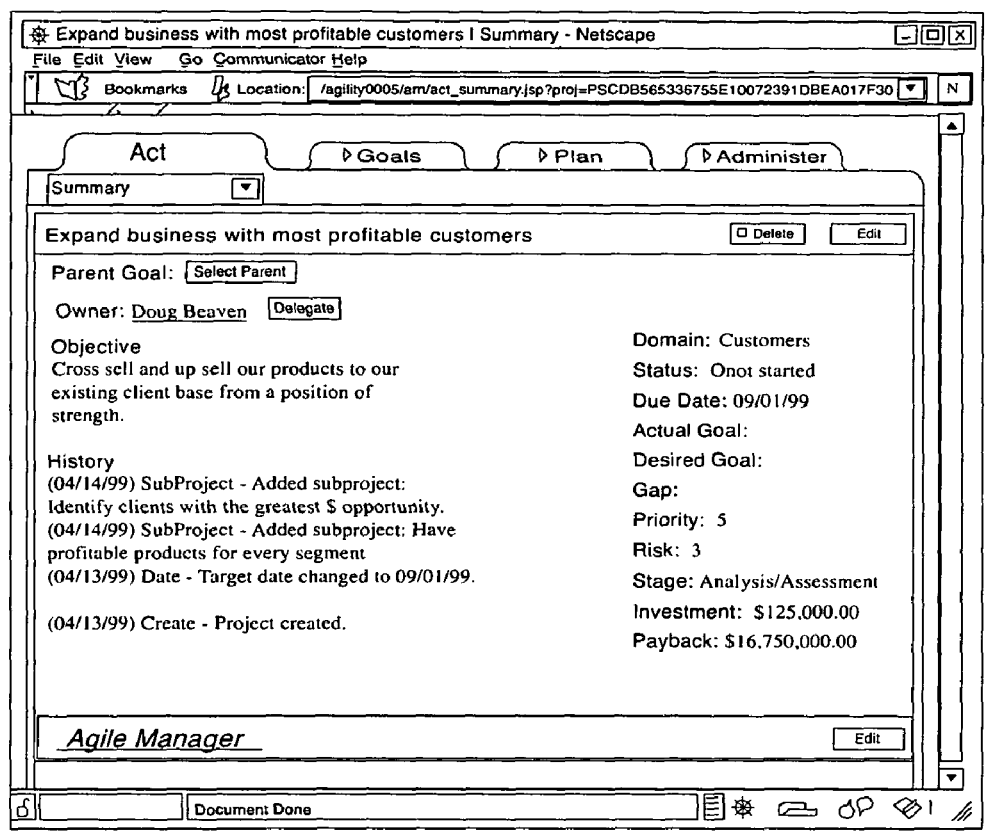

As these projects or goals are defined, they are added to the Goals Hierarchy (see FIG. 3) that provides access to the strategic hierarchy of goals and contributing projects or goals that the company is working on to improve performance. If the user wants to get more information about the new goal or any goal listed in the hierarchy, the user clicks on the goal of interest to get to summary information as shown in FIG. 13 for the goal "expand business with most profitable customers.

In summary, the planning sequence allows the user to update company plans either by starting with a clean sheet of paper and brainstorming a new goal and the projects that would bring it about, or by reviewing the existing hierarchy of goals and projects and deciding whether something is missing. Thus, the hierarchy typically includes a combination of new ideas being considered and maturing goals and projects that are in the process of implementation.

Figure 14:
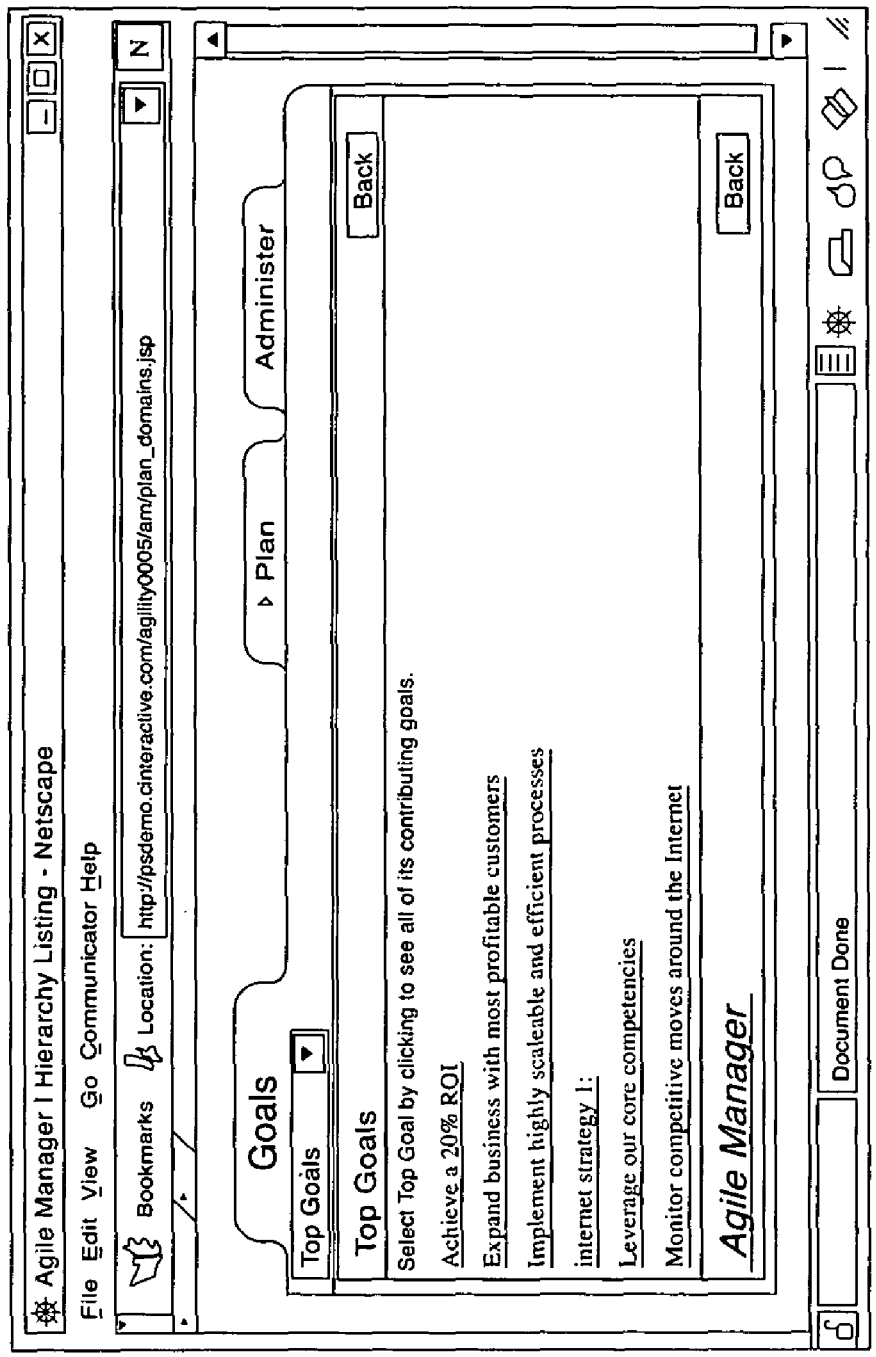

Managing the Hierarchy:

The Agile Manager allows managers to keep the hierarchy of goals and contributing goals in constant view and up-to-date with changing circumstances. The hierarchy can be viewed as a totality of goals and contributing goals affecting the enterprise (see FIG. 3), or can be viewed by top goals (see FIG. 14), depending on the user's interest, or by specific top goal (see FIG. 15).

Figure 18:
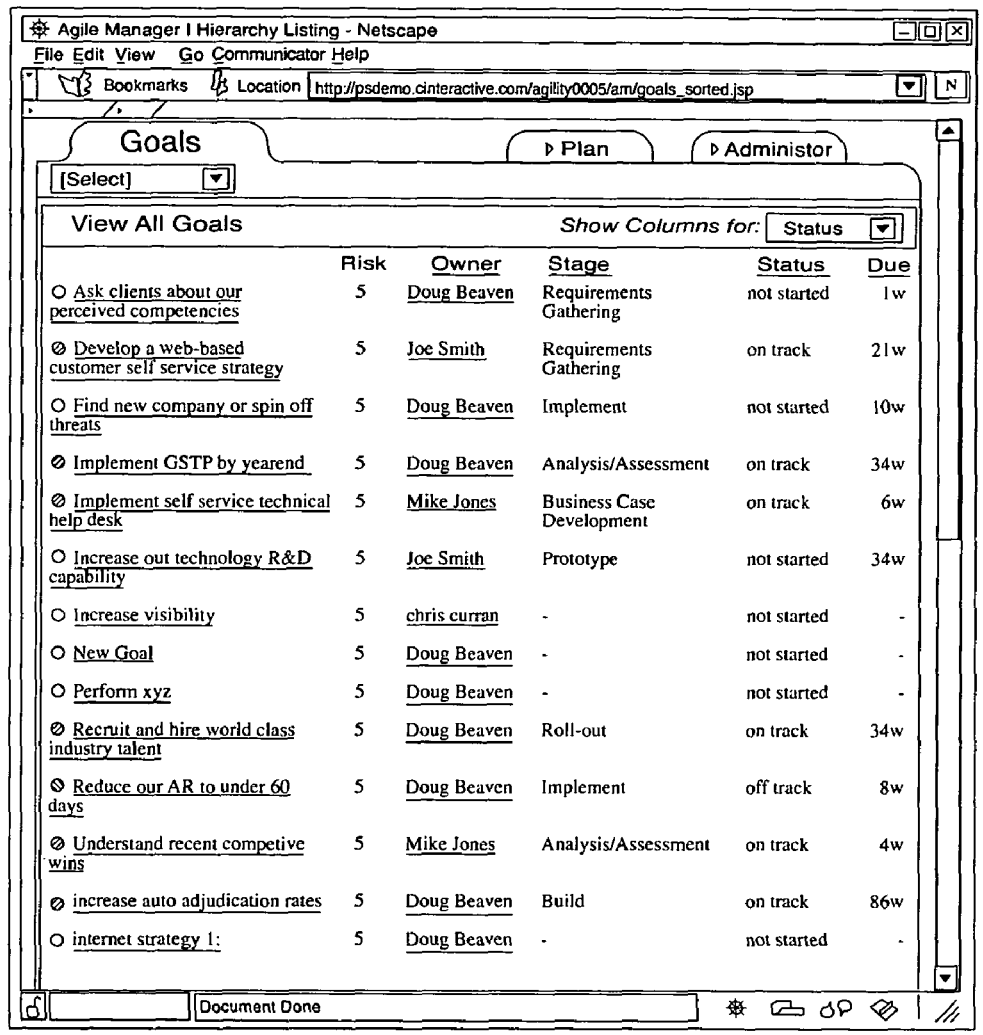
Figure 19:
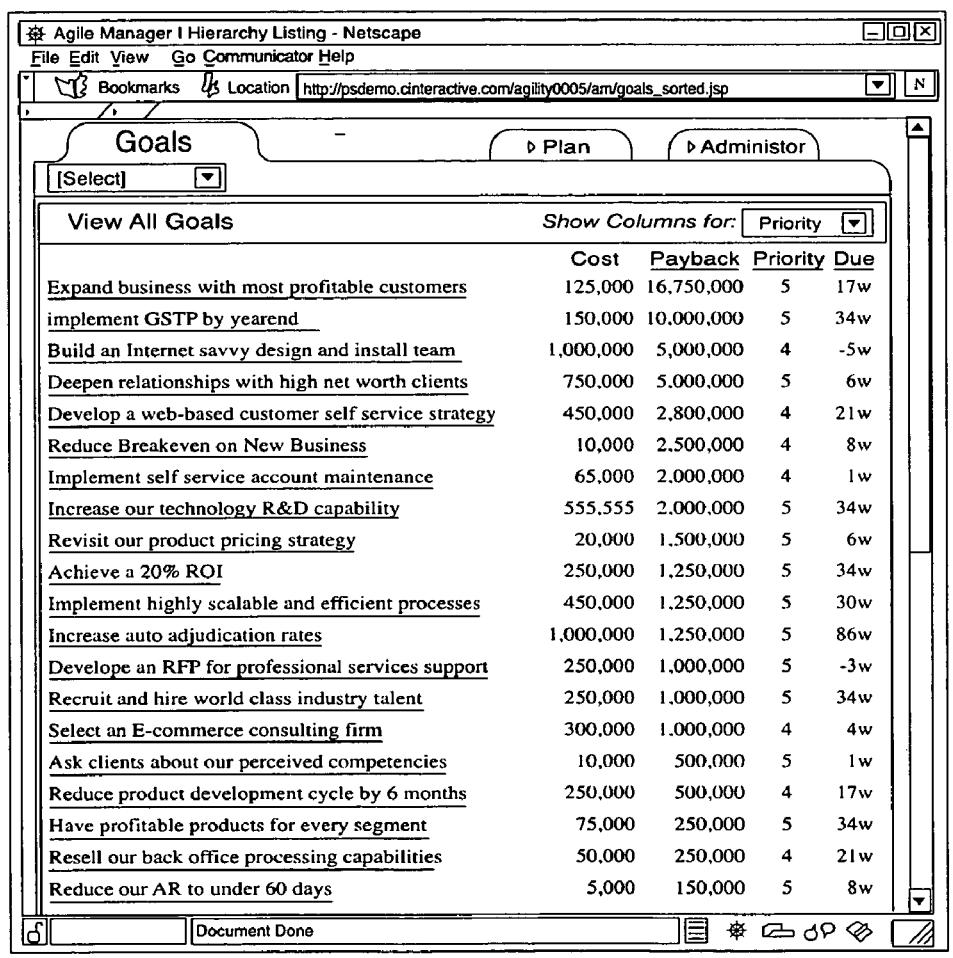

In addition, the user can view the hierarchy against types of information that help inform the user about the impact of goals on the business domains (see FIG. 16) or the priority (see FIG. 17) or impact of each of the goals, or about its status, stage of development, or ownership accountability (see FIG. 18). Because these different views are a click away, the Agile Manager supports a dynamic decision making process where discussion can move quickly from strategic to tactical considerations. For example, if the topic is budgets, the user can sort by goal or project cost (see FIG. 19), or by priority or return on investment ("payback") (see FIG. 20) and can be provided with information that can help the user decide where to commit resources based on factors such as benefit and risk. In another example, when managers meet and want to focus on key implementation issues, they can opt to switch to viewing "status" factors and can view goals or projects by status (e.g., on track or in need of attention) (see FIG. 18), which stage each is in (see FIG. 21), risks or who is responsible. Without the Agile Manager, each view would likely require a special study or report; the Agile Manager makes these different views available at a moment's notice. In addition, managers who want to explore any goal or project in more detail can click on the goal or project of interest and get more information. Similarly, managers who see something missing while reviewing the overall hierarchy can select "new goal" from the menu and enter a new goal or project (see FIG. 21)

Figure 23:
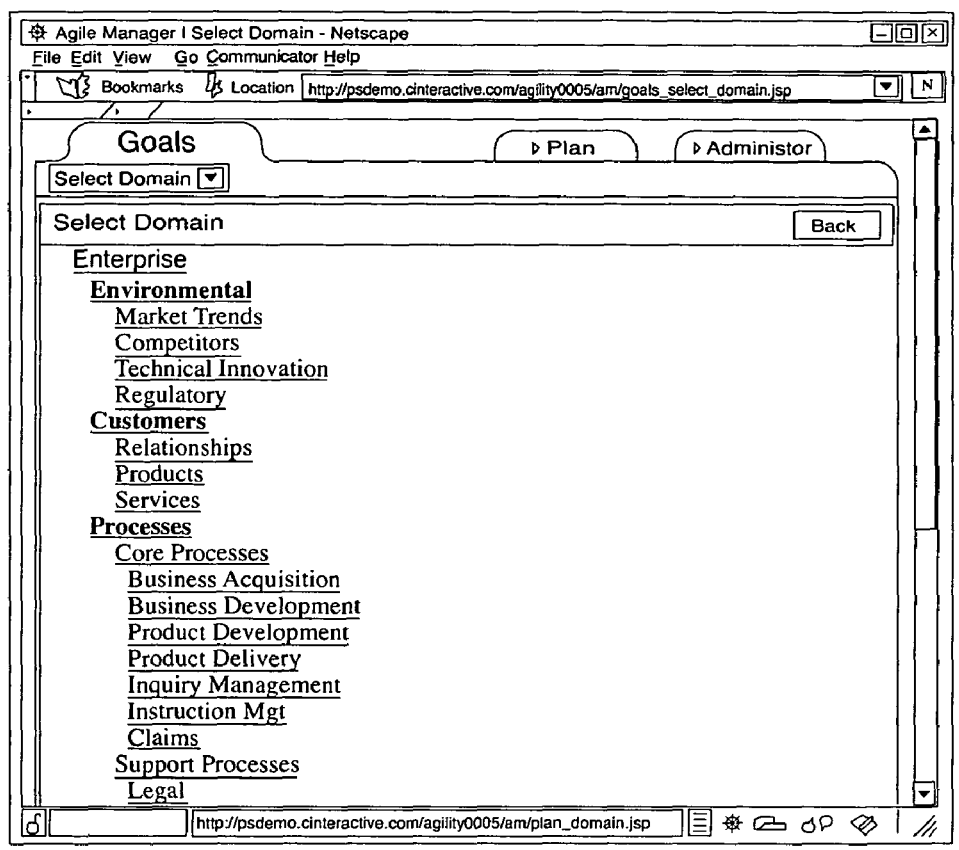
Figure 24:
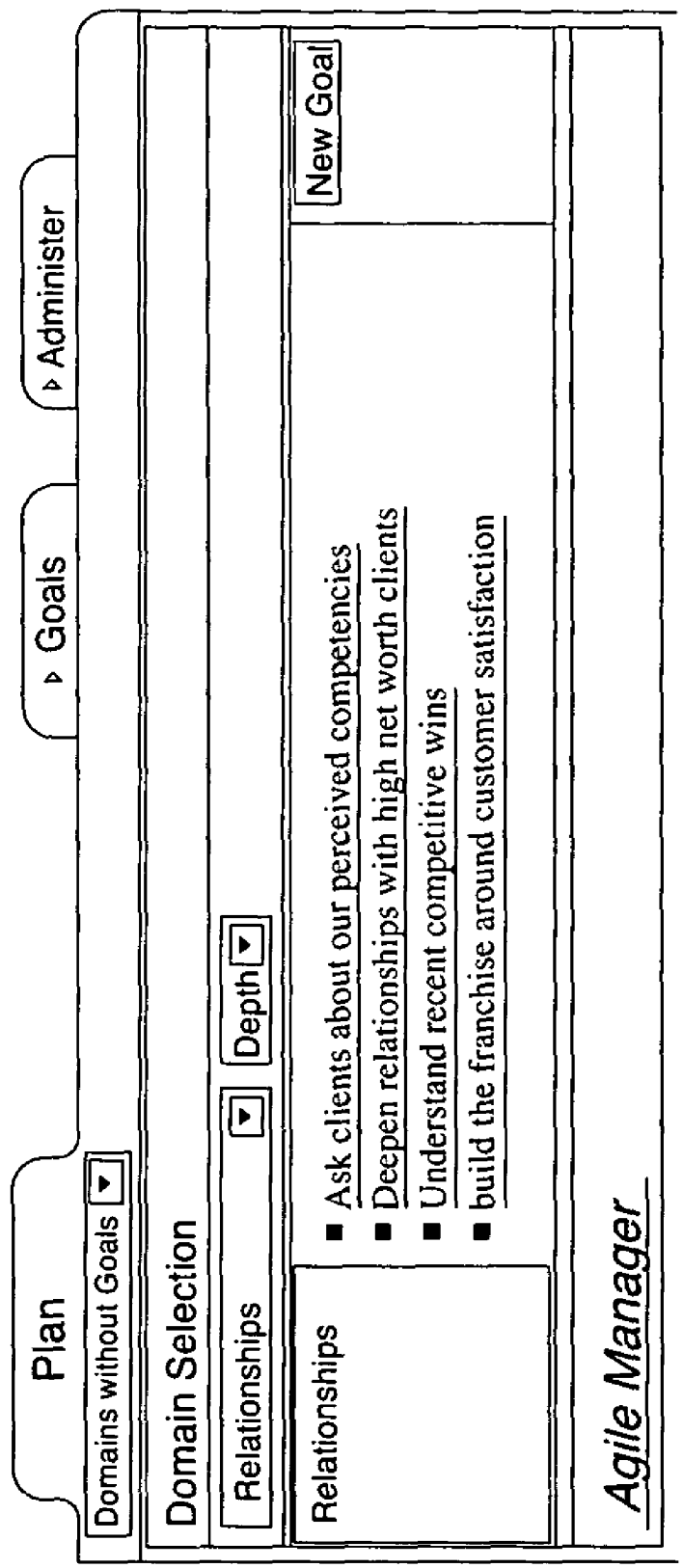
Figure 25:
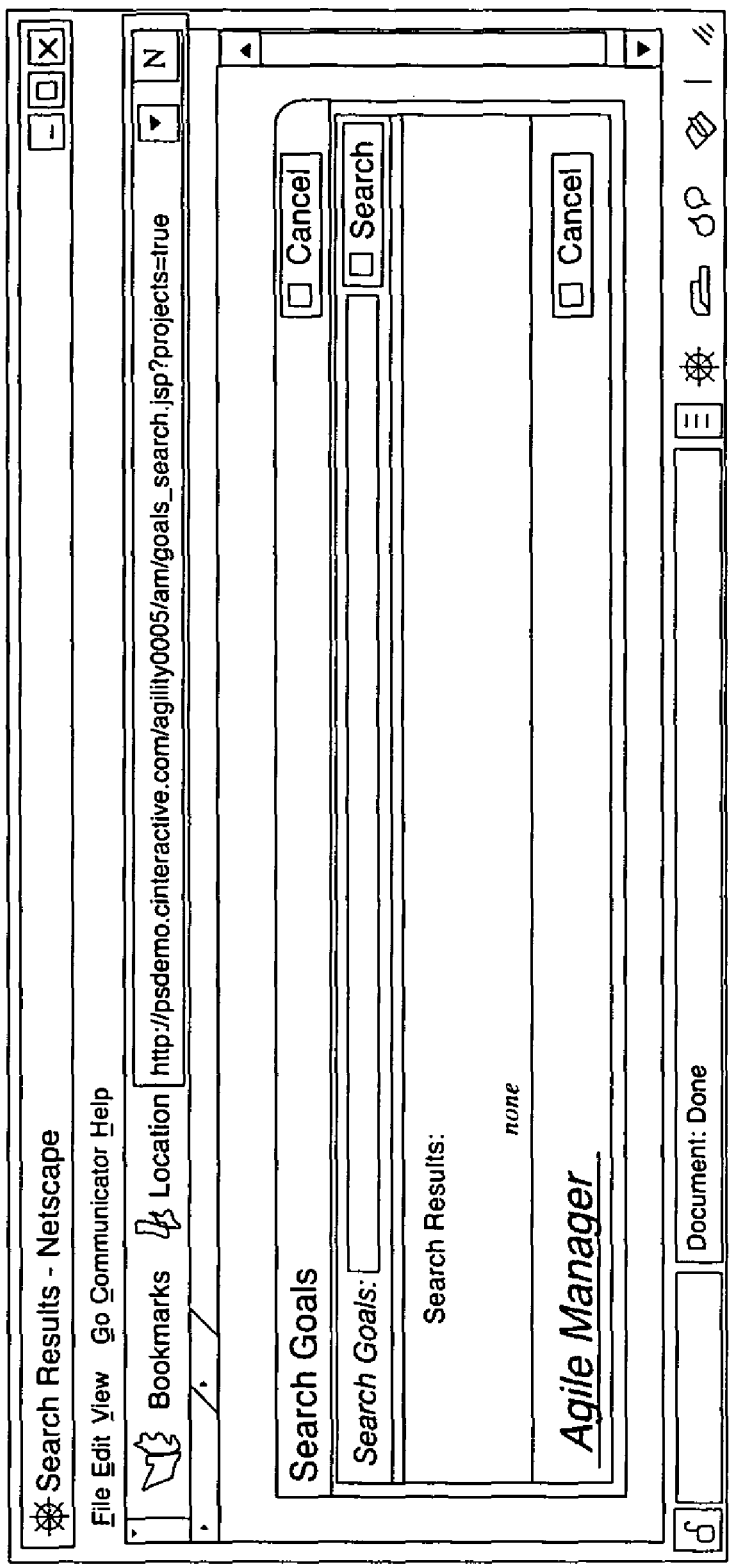
Figure 26:
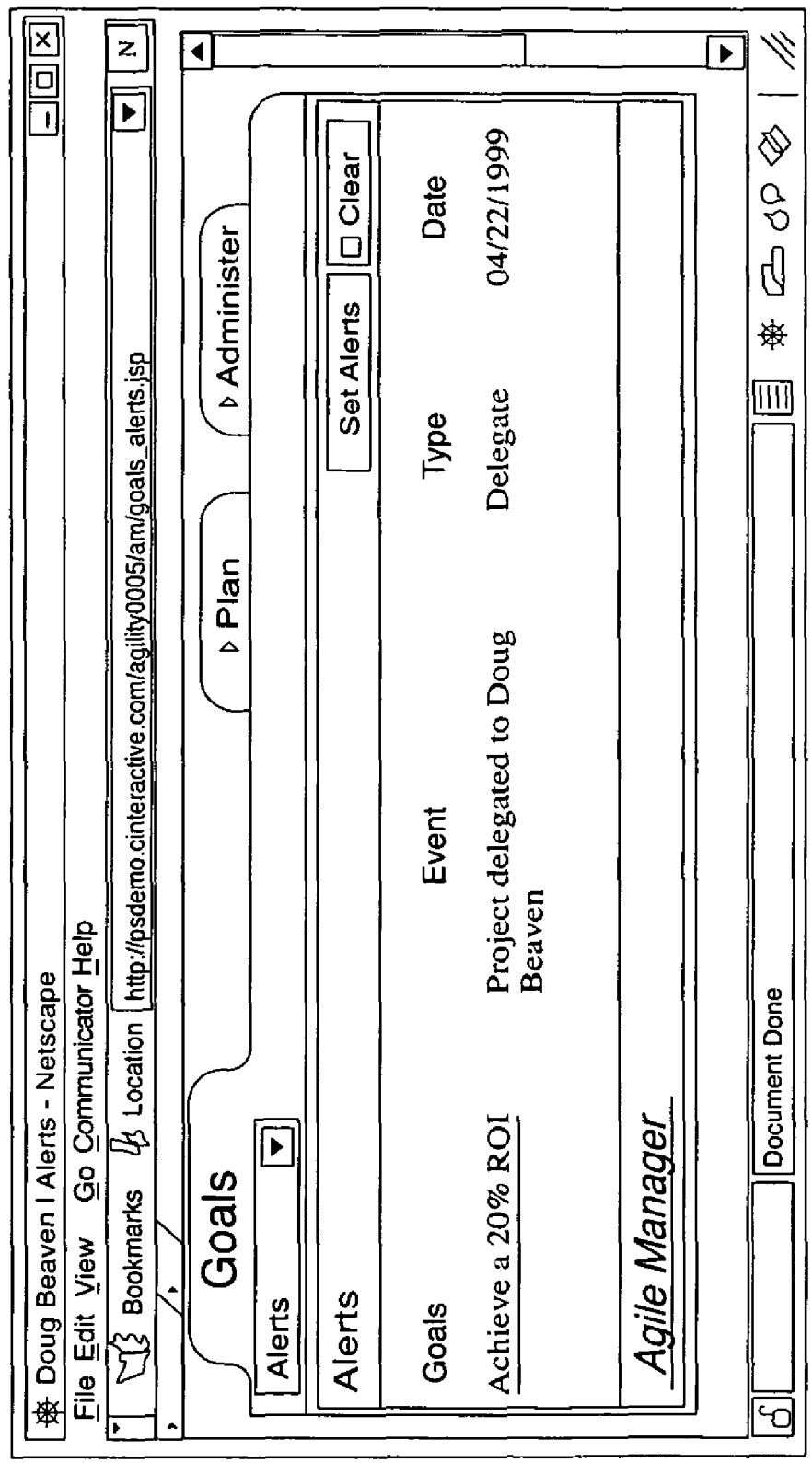

In at least some embodiments, an especially important view managers can use to manage the hierarchy is a view in which the goals and projects are sorted by domain. This view can be produced for any of a number of levels, e.g., for the entire hierarchy (see FIG. 16) or for a selected goal in isolation (see FIG. 24). A purpose of this view is to allow managers to understand quickly what initiatives are underway or will affect an aspect of the business. For instance, if a questions arises regarding what is being done about market trends, managers can click on any topic on the domain structure (e.g. customer relations) (see FIG. 23) and see immediately what initiatives are underway related to this topic (see FIG. 24). Users can also execute searches by name or word in the title of a goal or project (see FIG. 25), and can put Alerts in place (see FIG. 26) that will flag changes that occur in goals or projects previously indicated as being of particular interest (see FIG. 28)

Figure 27:
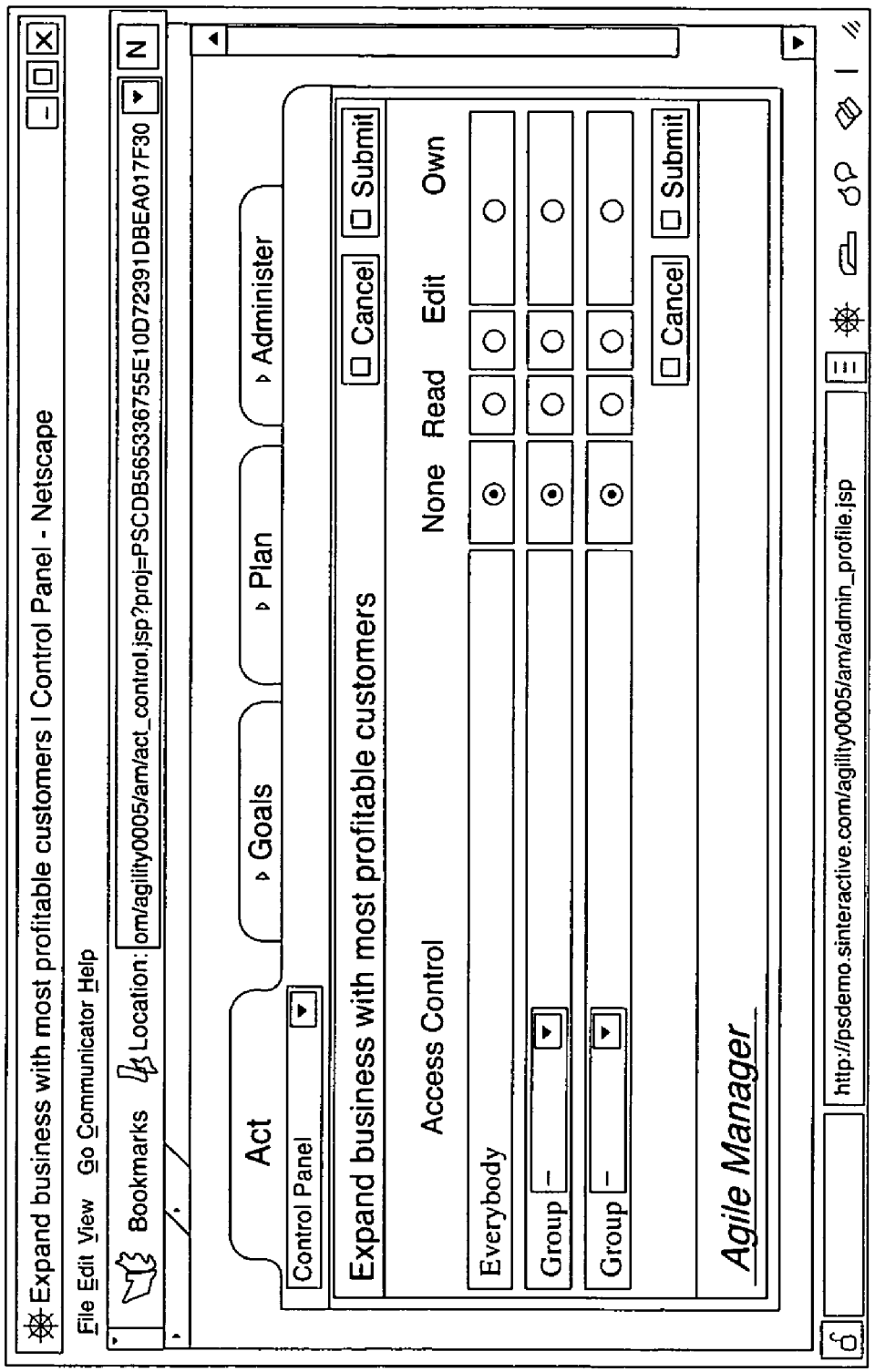

Executing Goals and Projects:

A major purpose of the Agile Manager, in addition to planning and managing the overall portfolio of goals and projects (i.e. the hierarchy), is to help managers accelerate implementation progress related to a goal and its contributing projects. A user has an array of choices to view when reviewing the progress of a selected goal. (The choices available depend on the permission that is granted by the Owner of a Goal to different types of users (see FIG. 27)).

Figure 28:
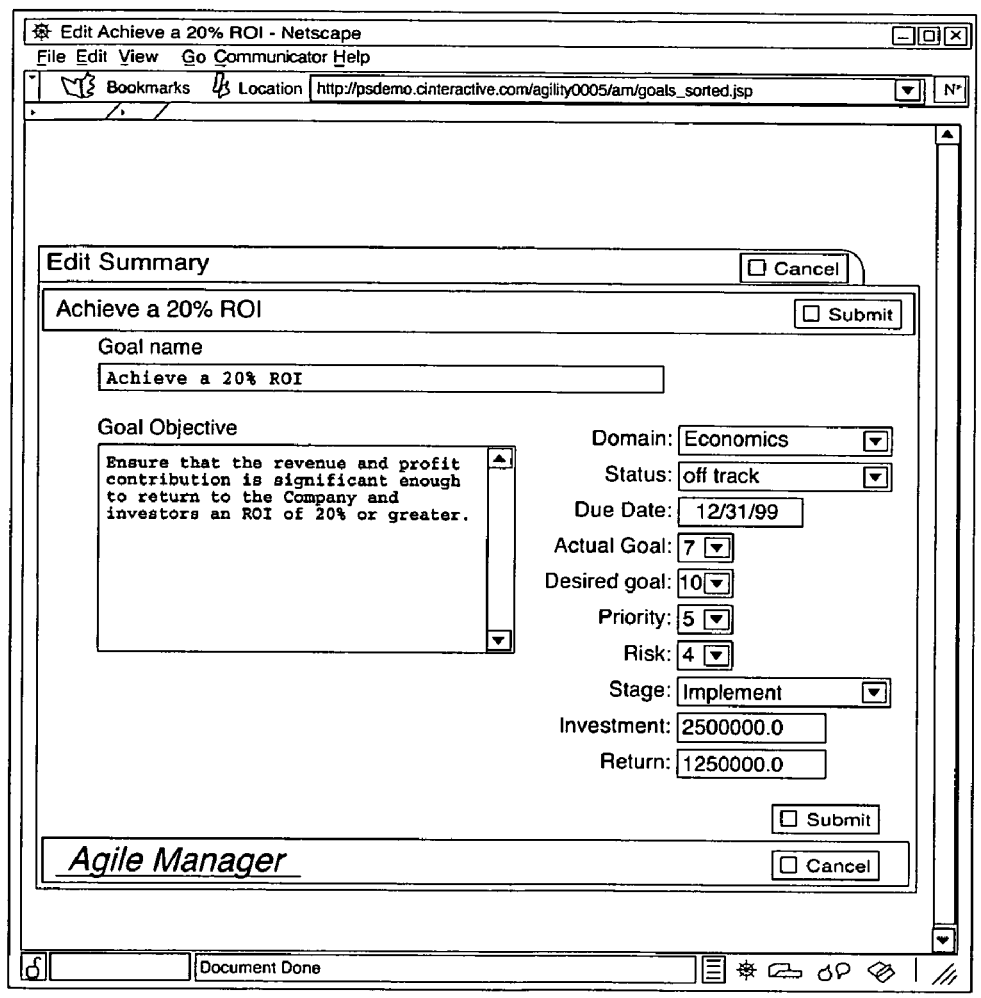
Figure 29:
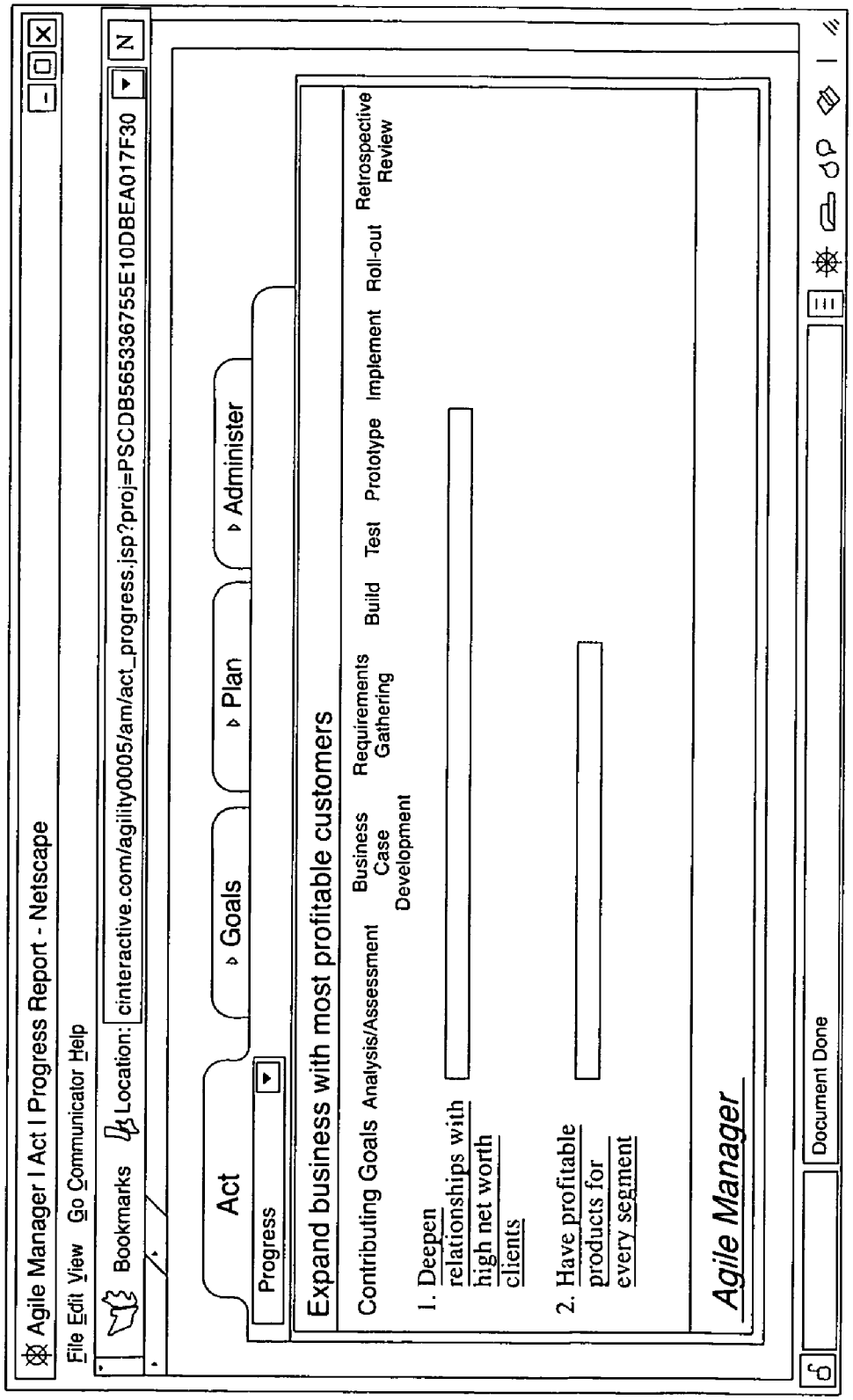

A "summary" page (see FIG. 13) contains information about the goal itself that can be edited (see FIG. 28. Other main views for helping to manage include "progress" (see FIG. 29) that displays the contributing projects or goals that must be finished or achieved before the parent goal can be fully accomplished. The "progress" view allows managers to view progress for the contributing projects side-by-side to determine whether the projects are properly synchronized or are out of phase with each other.

Figure 30:
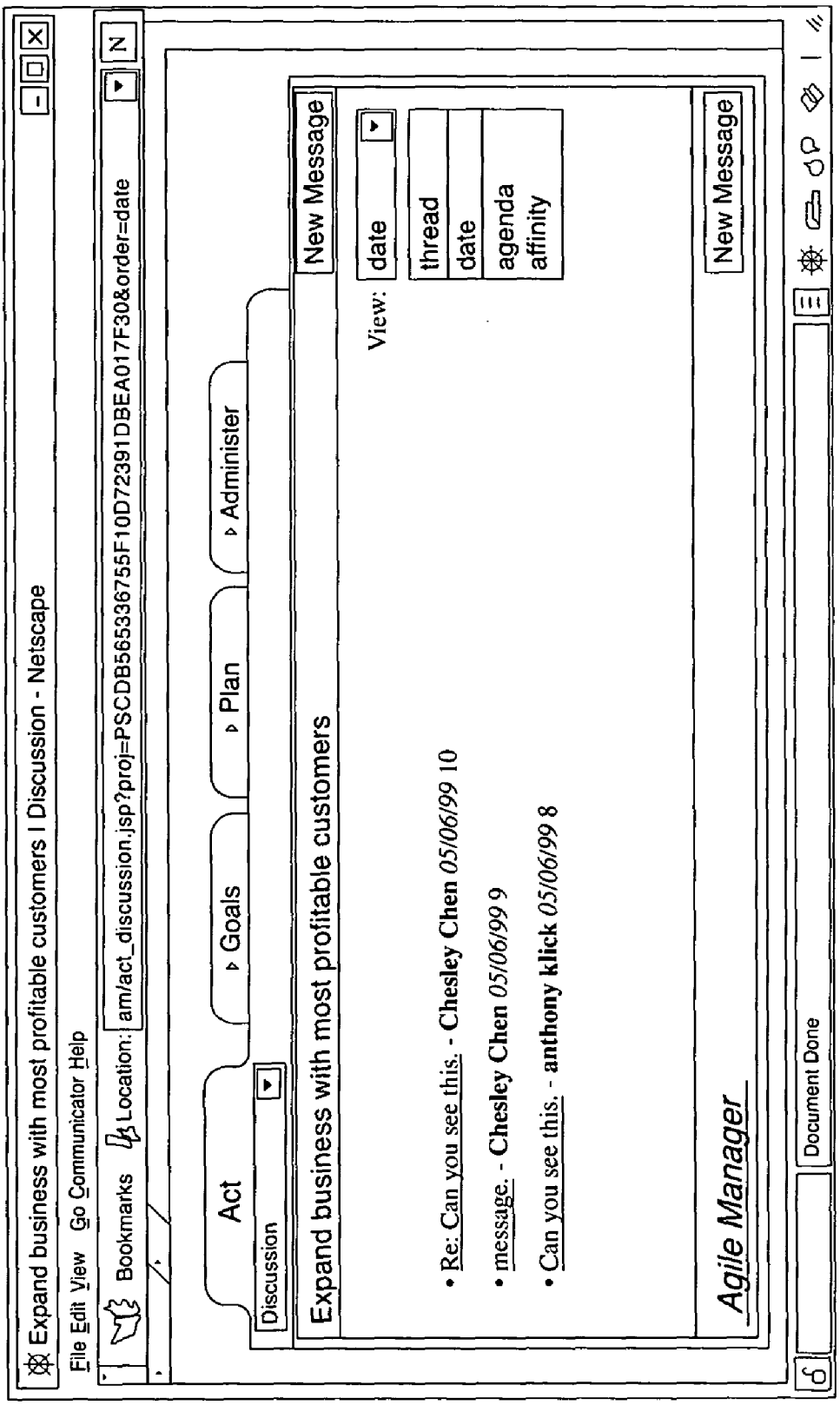
Figure 31:
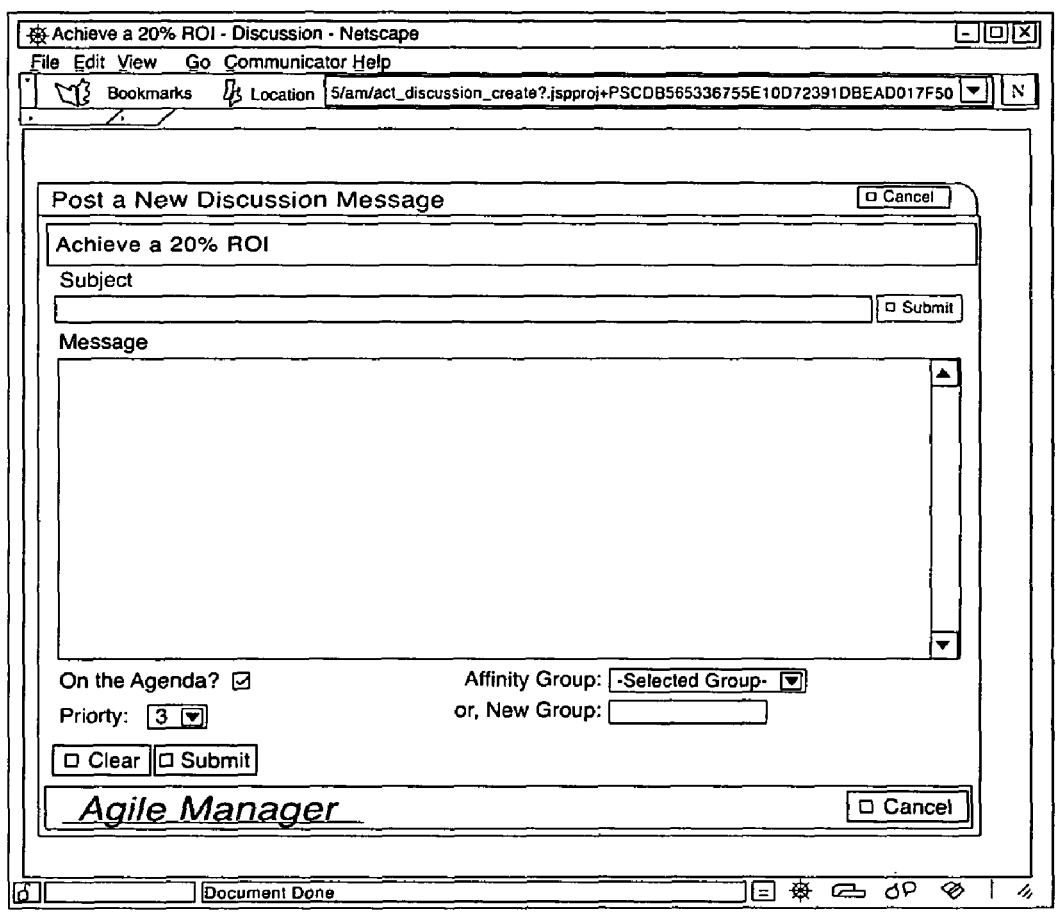
Figure 32:
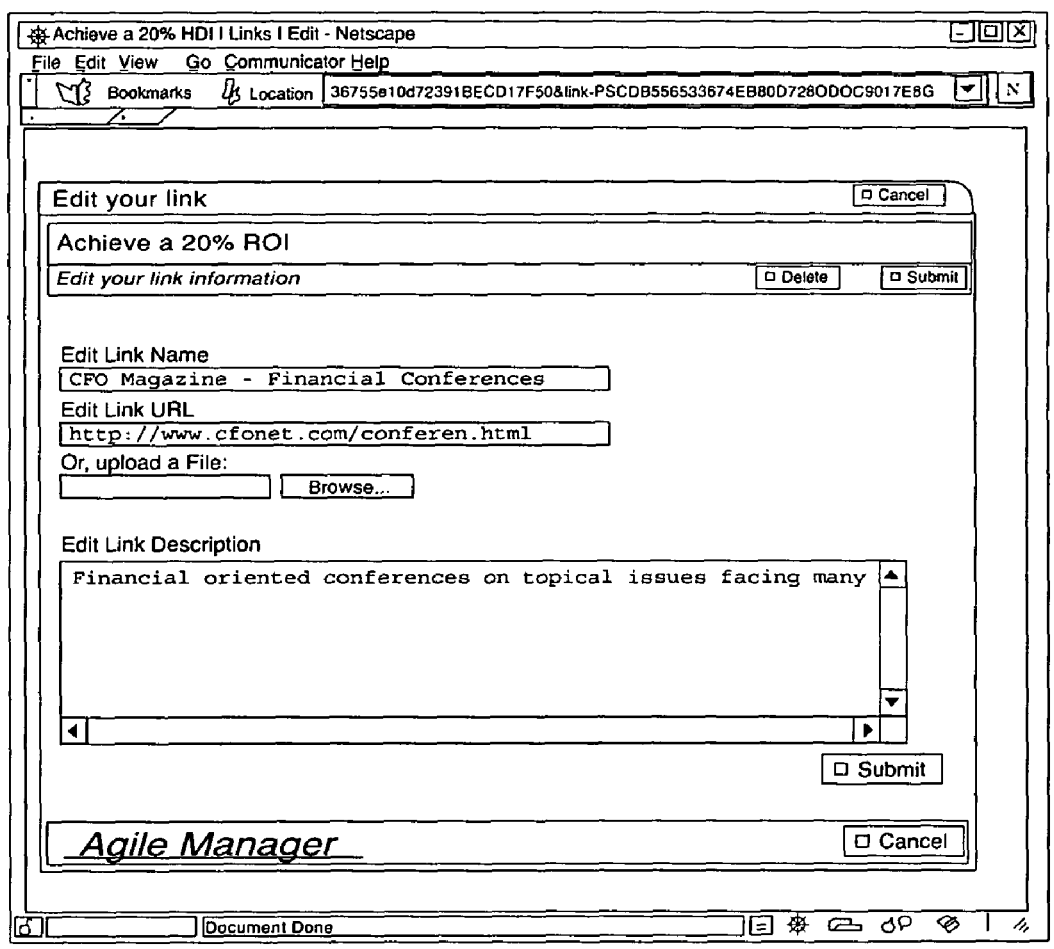
Figure 33:
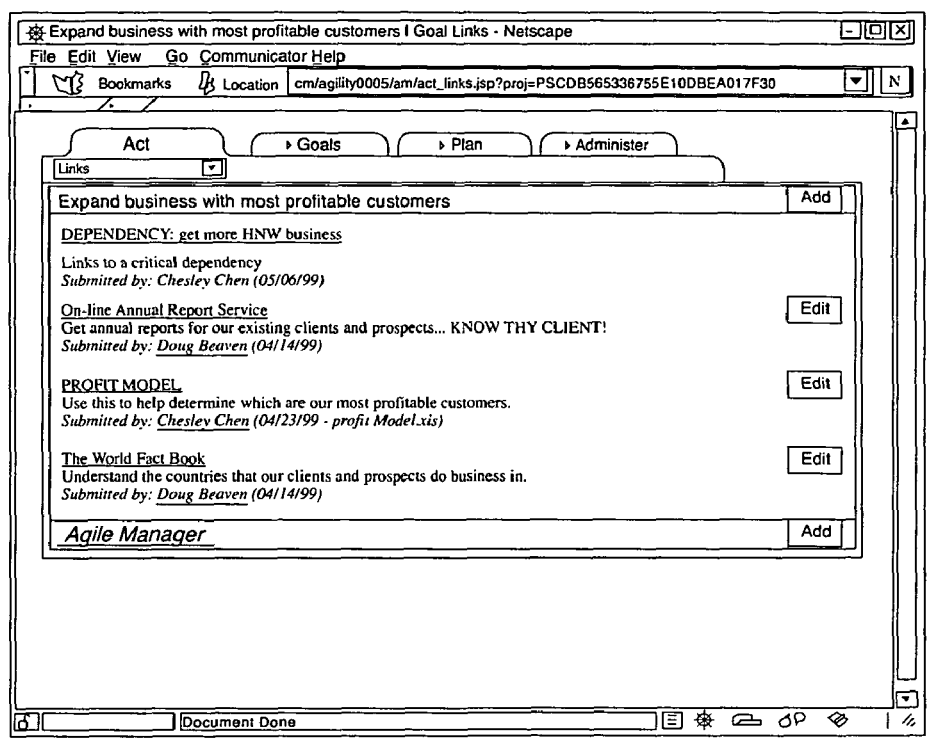

Other features are useful for managers and teams executing goals and contributing projects. A "discussion" feature (see FIG. 30) allows a user on the system to communicate directly about, and in the context of, the goal or project of interest. The owner of a goal can also select a particularly important part of the discussion and put it on an agenda (see FIG. 31). Another useful feature includes an ability to link to internal and external sources of information that goal or project teams believe are important to make accessible to users involved (see FIGS. 32 and 33). The links provide a practical application of knowledge management because the links allow teams to place information effectively or actually one click away so users can get at the information without excessively disturbing the state of the software. For example, users can hot-link to and open a detailed Microsoft Project plan if the plan is useful to the discussions. Users can place Word documents related to the goal where the documents can be found, and open the documents when needed. Similarly, users can link to Web sites of outside consultants or suppliers that may be related to the goal at hand. In this way, users can start using the software through the domain structure, find out the relevant issues, and access relevant knowledge context sensitively along the way.

The above sections have laid out a description of Agile Manager and the Agile Baseline module. In addition, the Agile Manager includes the Agile Company and Agile Know-How modules.

Figure 34A:
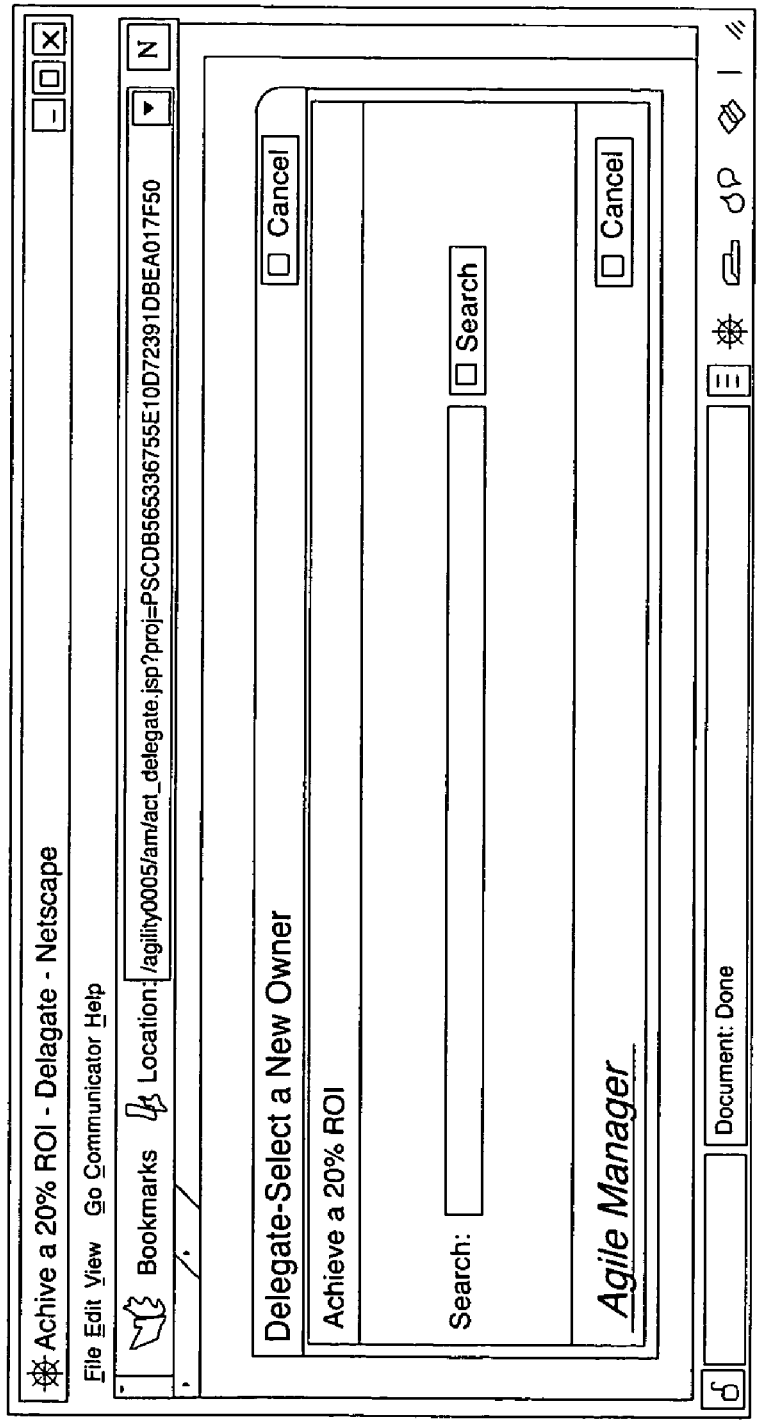
Figure 36:
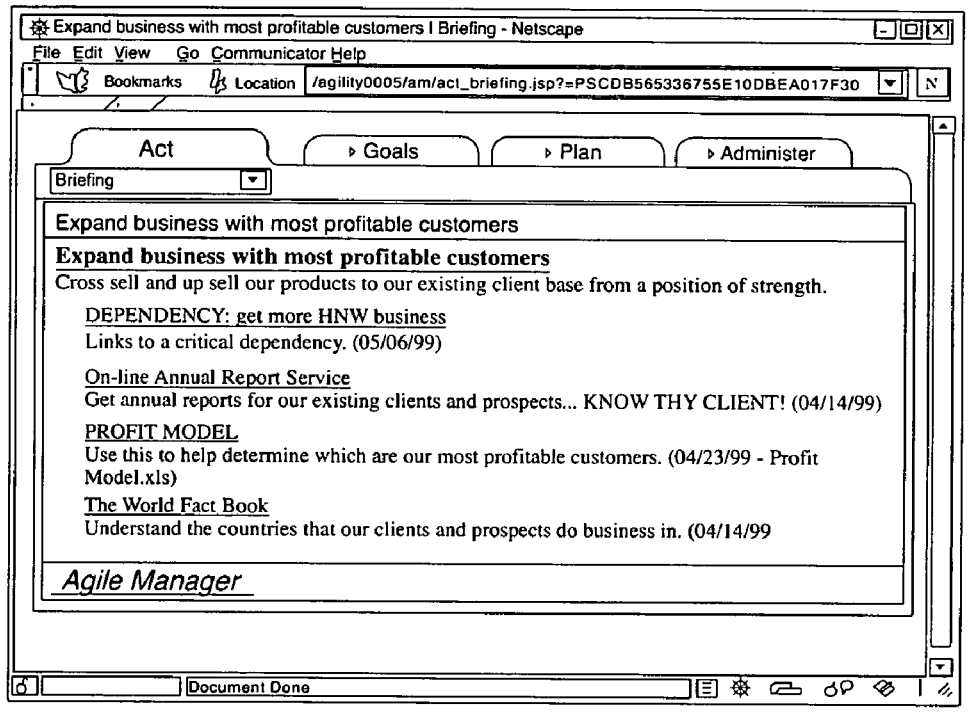

The Agile Company can be added to or made accessible from the Agile Manager and provides a survey that employees can take to assess how well the company or organization is managed in view of high performance criteria. The Agile Company software can be downloaded onto the client's server and a user on the network can complete a questionnaire of multiple pages, such as 20 pages, (exemplified in FIG. 34) and then the software can tabulate results to show strengths and weaknesses for sample analysis. The Agile Company also has templates that can be made available to help clients get started with a change program designed to improve specific high performance traits (exemplified in FIG. 36.

Agile Know-How links users to excerpts of publications about topics relevant to the goals and projects in which they're involved. For instance, the user can stipulate concepts, such as leadership, and specific aspects of the concept, such as senior leadership, and the kind of information needed, such as understanding the concepts, or how to be a good leader, and then get excerpts that match the needed information. In this regard, the Agile Manager enables an organization to use the Agile Manager as a single source for not only information about strategic initiatives but also knowledge available inside and outside the organization that can help make the organization more agile.

The input screen and process flows include:

Goal Hierarchy Screen: this is the default screen (see FIG. 3) and an important navigational screen for accessing details about any single goal or initiative, or accessing various views.

Once the goals and contributing projects have been loaded, the default screen presents a goal hierarchy and can be used as follows:

Hierarchy: the left side of the screen presents an outline the top section of which represents the organization's strategic implementation plan, i.e., in which the top level statements represent strategic goals that are the highest level organization goals, and the next indented level statements represent contributing initiatives that are indicated as having to be completed for the strategic goals to be achieved. A user authorized to see the portfolio view can see where the organization wants to go and what it will take to get there, with the goals and projects associated together in one spot.

Unassociated Goals: the goals and initiatives under this heading are indicated as being either no longer relevant strategically or not yet placed in the hierarchy.

Functions from this screen: If a user is unhappy with the placement of a goal or initiative or wants to adjust attributes of the goal or initiative, the user has only to click on a goal or initiative listed to retrieve its related information. For example, a click on the initiative takes the user to a summary screen (see FIG. 13 for example) for this initiative. The following information fields are available for any goal or initiative:

Heading: the entry shows the name of the goal or initiative for which basic information is displayed on this screen.

Owner: this entry lists the name of the person responsible for implementation of the goal or initiative and authorized to edit its related information.

Parent Goal: this entry lists the name of the goal or initiative immediately above or superior to the initiative that is active. An advantage of showing the parent goal is that a user working on the initiative is instructed that the initiative is contributing to the parent goal.

Objective: this entry shows the objective of the initiative so a user is instructed as to what the initiative is specifically to accomplish.

History: the entry maintains a running log of changes made to the initiative, and indicated by whom and when. Here is recorded when the project was created and when delegated to the current owner. The changes are monitored by the computer so that the user can identify which changes the user wants to have flagged automatically when they are made (see View Alerts below).

Status: this entry identifies the category such as "on-time," chosen to summarize the status of the goal or initiative's progress so that the user can determine at a glance whether the goal or initiative is in need of attention. The categories listed here can be modified to fit each client situation when an edit mode is selected.

Due Date: this entry indicates the date by which the initiative is to be achieved.

Priority: the benefit entry presents a numerical score from 1 (lowest) to 5 (highest) based on user judgement about the relative value of the initiative or goal in terms of improving the business results. For example, the goal may be rated 3 of 5, i.e., average. An advantage of a simple rating is that users can quickly understand the rating scale and then discuss specifically the reasons behind the rating.

Risk: this field presents a 1 to 5 numerical score that indicates a risk level for the goal or initiative, such as that the team is new, that the technology is untested, or that the market is new. By keeping track of risk, managers can work proactively to reduce risk and thus increase the probability of a successful implementation. In addition, when there are resource constraints, decisions about which initiatives to continue to pursue may depend on a combination of benefit scores and risk scores to indicate how much managers can count on achieving the initiative and having a positive impact on the business. For example, with a priority score of 3 that is lower than a risk score of 4, a question might be raised about whether to continue to fund the initiative if there are other initiatives that have better benefit/risk characteristics.

Project Code: (not shown) this field allows an alpha-numeric identifier to be assigned for administrative purposes.

Stage: the stage field shows where in the project life cycle the goal or initiative is so that a user can keep track of how the goal or initiative is progressing and what remains to be done. For example, the initiative shown is in the "start up" stage. In the edit mode, several stages are displayed from which the owner can pick one that is descriptive of the status of the initiative.

Investment: this field captures the cost of or investment in each particular goal or initiative so the user can readily access financial information related to decision making and priorities.

Payback: the payback field refers to the economic return anticipated for achievement of the particular goal or initiative. In conjunction with the investment field, the payback field can allow a ratio of return on investment to be produced, which ratio may play a key decision making role in an assessment of the relative value of one initiative versus another.

Rank: (not shown) this field is available for formulas developed for each client for calculating the ranking of each goal and initiative, including the combined values of initiatives contributing to a particular strategic goal.

Score: (not shown) the score field relates to a unique calculation of the cumulative value of each goal and initiative based on weighting techniques appropriate to the user (e.g., alignment with corporate values, brand, payback, competitive position, management attitudes). Both the rank and score fields are provided to help users prioritize goals and initiatives in the portfolio.

Edit button: when a user clicks on the edit button, the user is taken immediately to the Basic Goal Edit screen (see FIG. 28) which allows the authorized owner to modify the basic information about the particular goal or initiative that has been selected. The Project Name and Description fields are for text, the Due Date is for calendar completion date information, and the other fields such as domain, status, benefit and risk priority, and stage present pop-up menus. When changes are submitted, the changes are automatically accessible to whomever uses the system and are captured in the history log.

Delegate button: this button allows the user to designate or re-designate the individual who is the owner of the goal or initiative by going to the Delegate Screen (see FIG. 34A) and searching through names of candidates to whom responsibility can be delegated.

Delete button: when this button is selected, the user is automatically asked whether the goal or initiative is to be deleted and, if so, the goal or initiative is deleted and archived in case subsequent retrieval becomes necessary.

Project Menu: this pop-up menu lists the choices of views the user can access from the Basic Goal Info Screen as regards the active goal or initiative that has been selected. The view choices include the following:

Control Panel: when this choice is made the user is presented with the Control Panel view (see FIG. 27) and can review the permissioning rules. If the rules are satisfactory, the user can retreat and proceed along another path. If the rules need to be changed, the user clicks the edit button and is presented with another version of the Control Panel that can be edited and submitted. Only the authorized owner is able to make changes.

Figure 35:
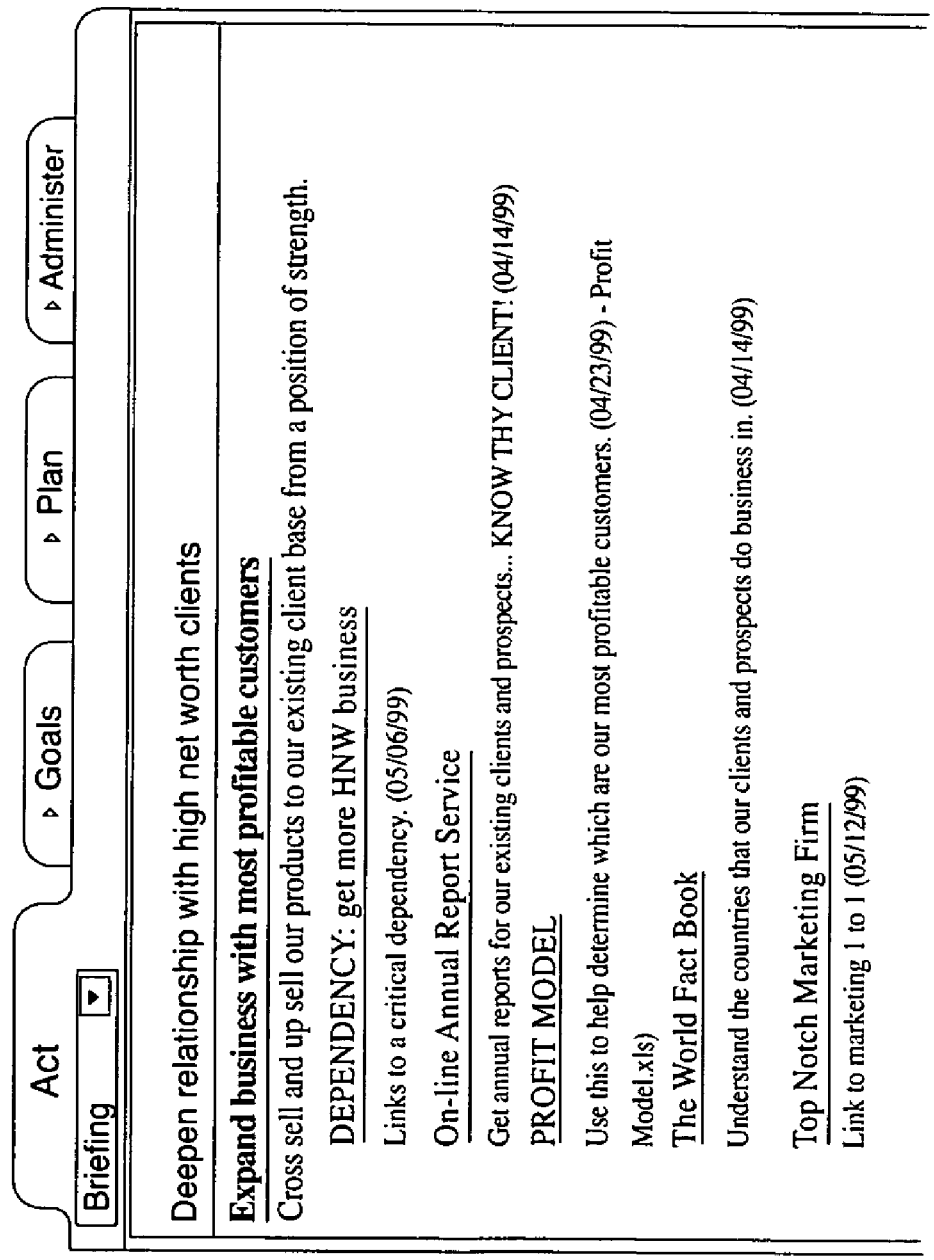

Project Briefing: if the user wants to understand better how the 15 active goal or initiative relates to the parent goal, the user can click on this choice and will be presented with the Project Briefing screen (see FIG. 35). Here salient information is displayed from the Objective field in the basic information related to the selected goal (see FIG. 36). In addition, sources of knowledge that may be helpful to access are listed so that the user can hot-link to them if need be. In a typical embodiment, this screen cannot be edited and is just a view.

Figure 37:
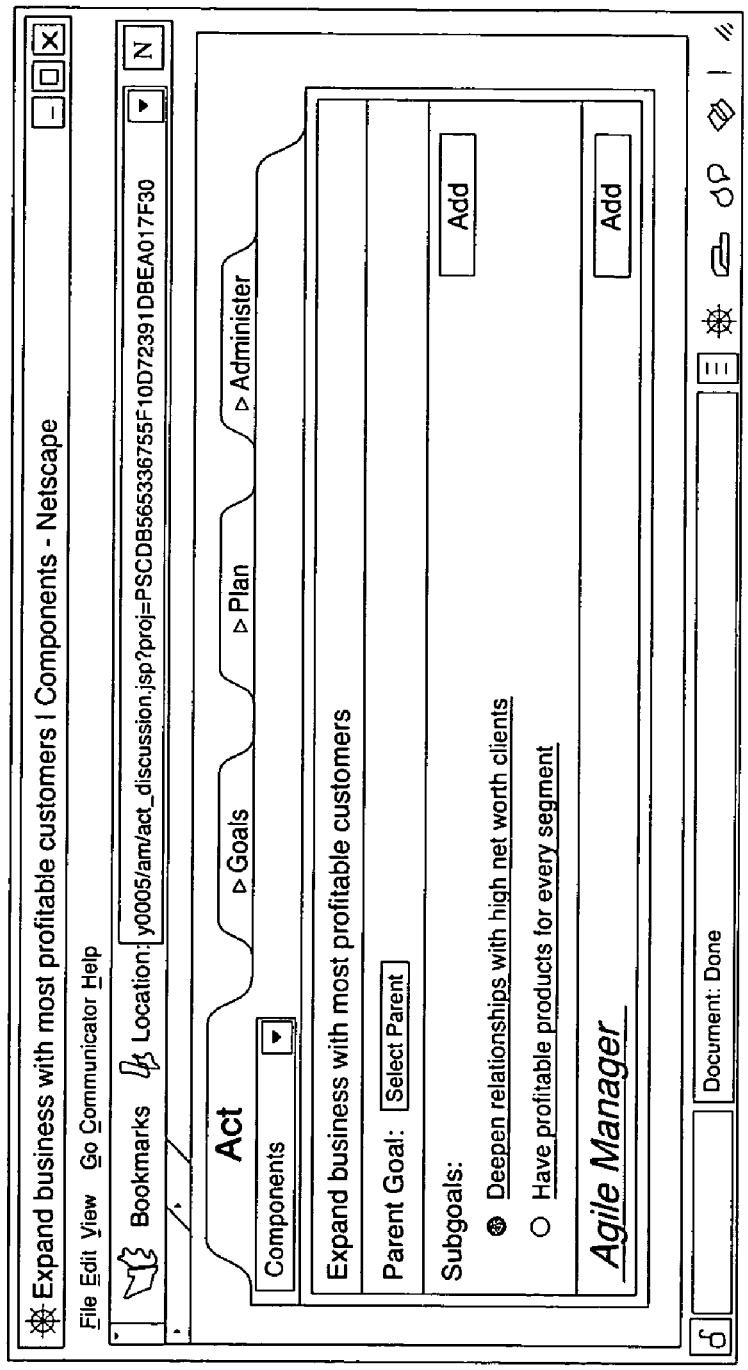
Figure 38:
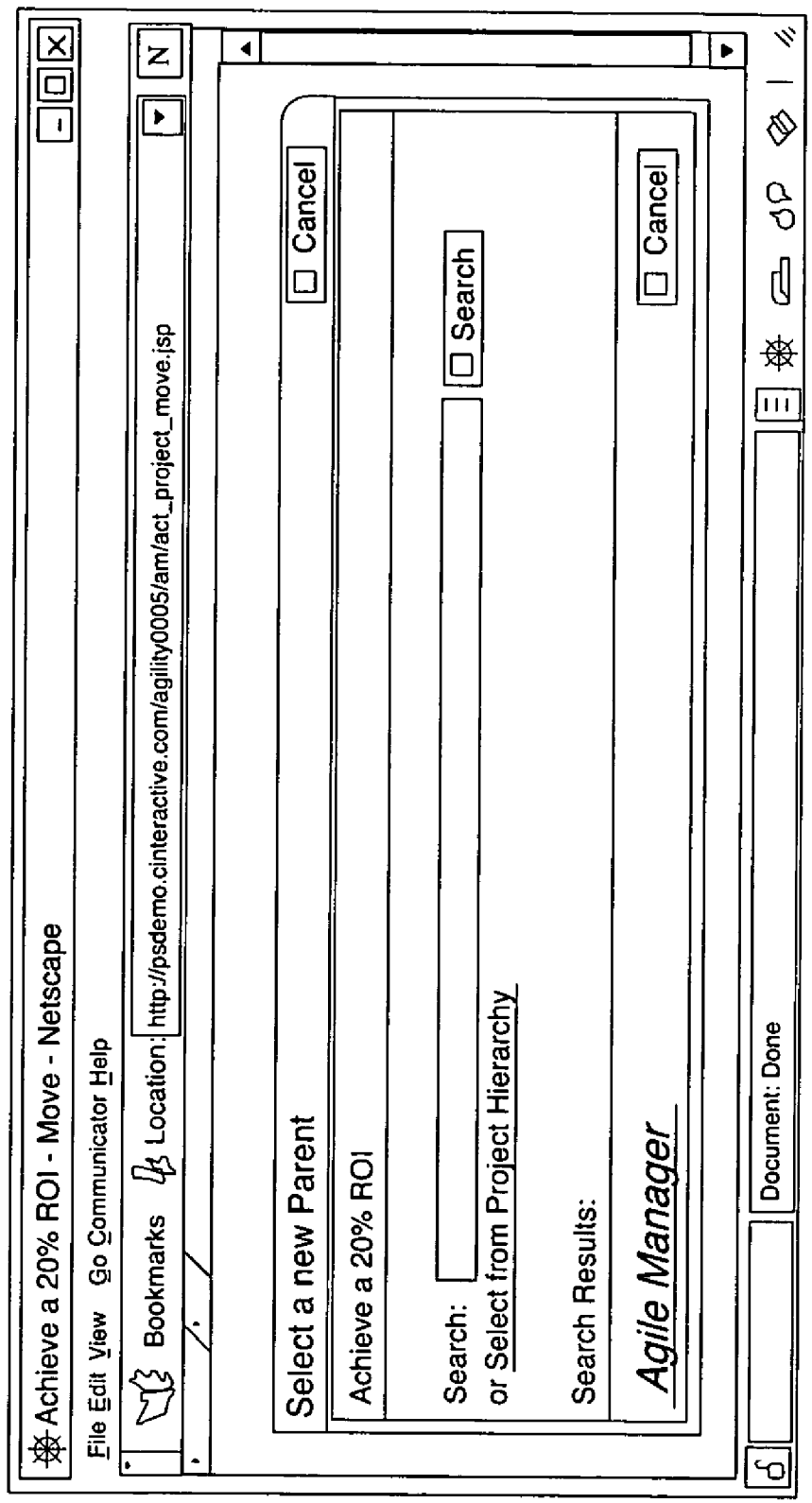

Goal Components: when the user makes this choice, the user is presented with a Goal Components screen (see FIG. 37) and, in a typical embodiment, views only the contributing goals that are related to the parent goal. From this screen the user can access different functions including:

Select Parent: when the user wants to change the position of an initiative in the hierarchy, the user clicks on this button and is taken to the Select New Parent screen (see FIG. 38). On this screen the user can either search for the new parent goal or initiative if the user knows its name, or click on "Select from Project Hierarchy" and be presented with another screen that lists the hierarchy. The user then selects a goal or initiative as the new parent, and when the user clicks on this selection, the original initiative is associated with the new parent and shows up so associated in the hierarchy.

Add SubProject: when the user wants to add a new subordinate initiative with which the user is working, the user can use the "add" button to view New Goal screen (see FIG. 7) and enter information about the new initiative using the standard template. When the information is entered, the new initiative is placed appropriately in the hierarchy.

Add Milestone: this button allows the user to flag and define major milestones in the initiative, which can be useful for adding more detail if appropriate for monitoring significant targets. The Create Milestone screen allows the user to name and define the milestone and to set a finish date and status.

Figure 39:
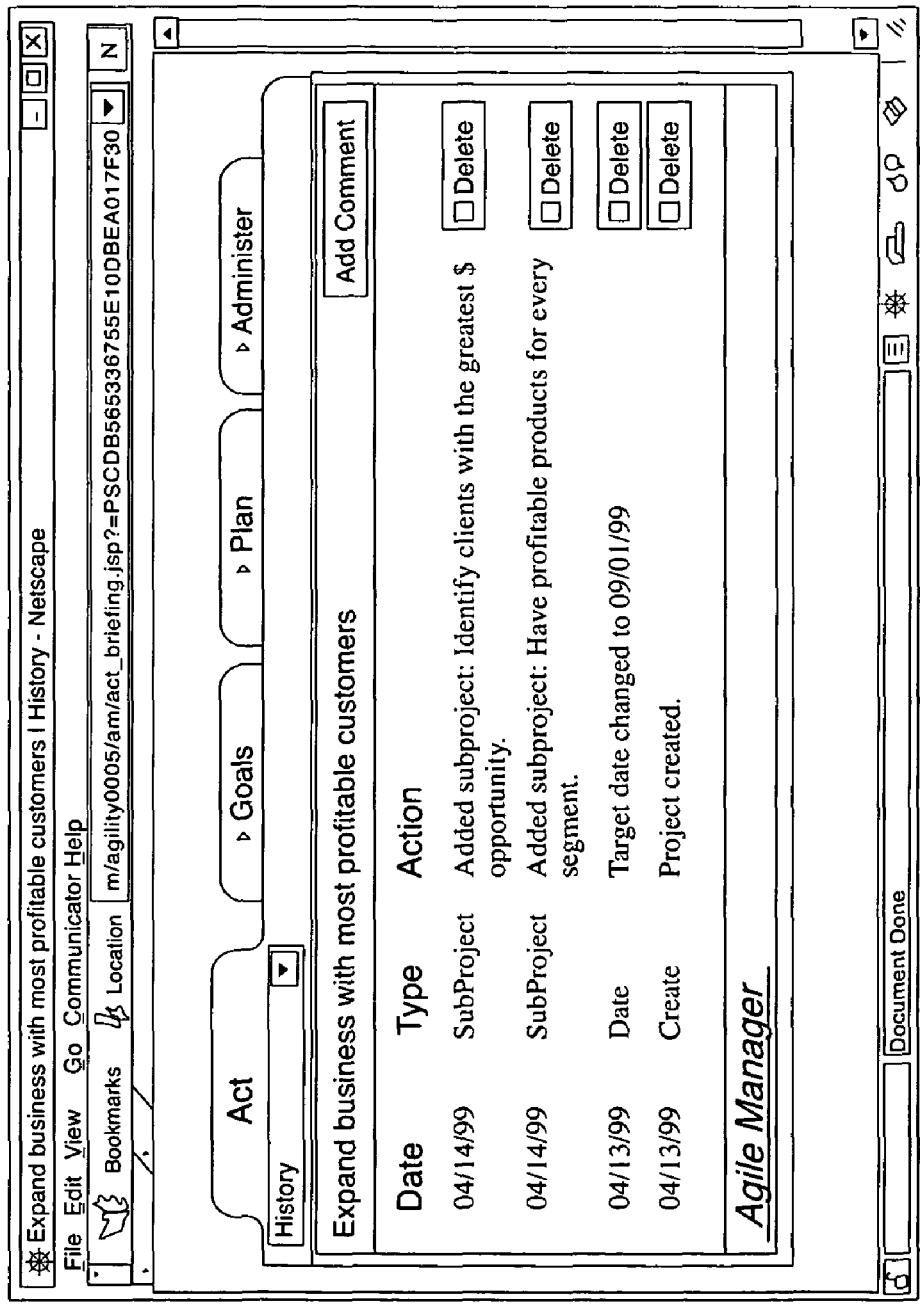

Project History: this button takes the user to a display of project history (see FIG. 39) that shows when changes were made, from creation of the initiative to modifications to any of its attributes. This history can be very valuable for tracking key events in the life of a goal or initiative for analytic or other reasons. From this screen the user can also add comments to explain particular events, or add new events.

Links: this button takes the user to a view (see FIG. 33) of the links to any knowledge sources that the initiative team has chosen to put here so that the knowledge sources will be accessible to any members when necessary. An advantage of this facility is that with the domain structure linked to goals and initiatives and with knowledge linked to the goals and initiatives, the organization is provided with a clear and natural organization for placing and locating critical information when needed. From this screen the user can add links (see FIG. 32).

Figure 12:
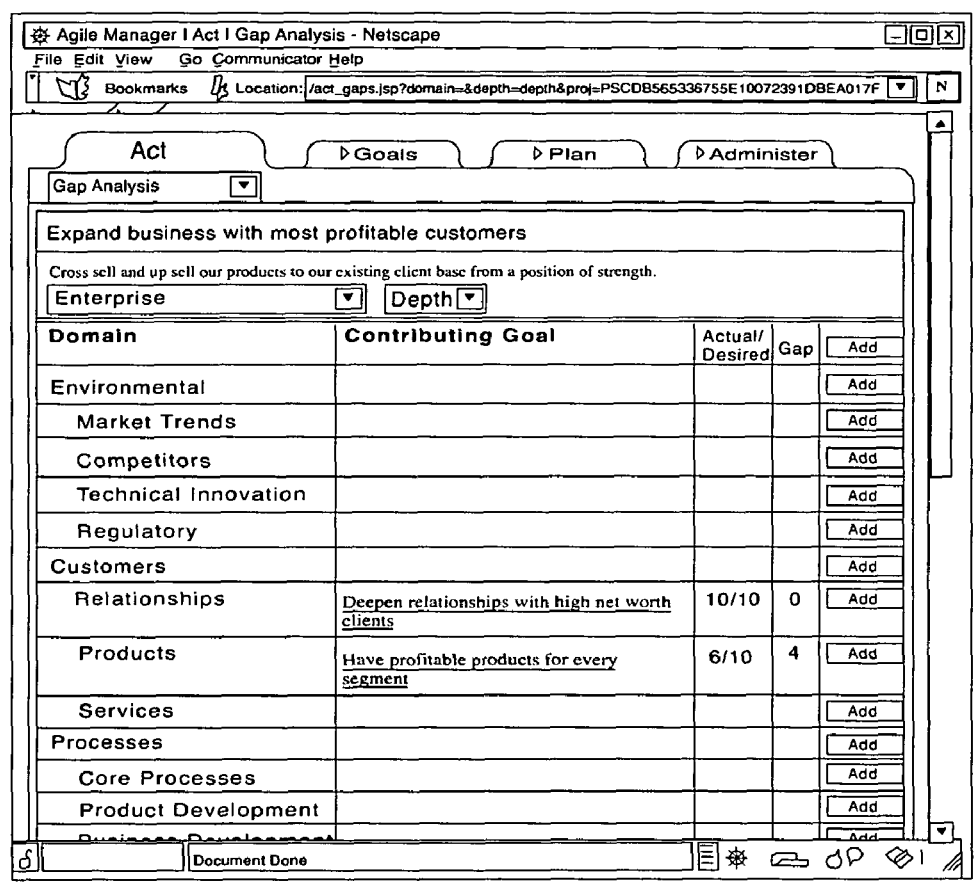

Gaps Analysis: this button takes the user to the list of contributing goals/projects (with actual and desired weightings) by domain—screen (see FIG. 12). From this list the user can determine whether the changes for each key domain have been identified. If the user is dissatisfied, the user can either select the edit button and change specific information about one or more of the existing contributing goals/projects or click on "Add" to get to the Edit Contributing Goal screen (see FIG. 7). In the latter case, the user can select a domain and enter the name of a new initiative, its actual achievement weighting (based on current status) and desired achievement weighting (based on the importance of this initiative to achieving the parent goal). When the new initiative idea is submitted, the software displays the Gap Analysis view with the new initiative added. The user can continue to add new contributing goals/projects by domain.

When the user is comfortable that the domains have been covered, the user can click on a listed goal name and proceed directly to its summary screen to begin to flesh out more information about its characteristics such as its owner and objective.

In at least some cases, the value of the Gap Analysis is substantial, because it allows users to brainstorm what changes in the domain structure need to be made if a particular goal or initiative is to be implemented successfully. In this regard, the combination of domain structure and gap analysis keeps members of the organization focused on how the organization works and where improvements need to be made for strategic or tactical reasons.

View Menu: the menu at the top of the Goal Hierarchy screen (see FIG. 22) give the user access to hierarchical views that facilitate decision making related to creating the hierarchy itself, reviewing status, or flagging changes particularly interesting to the user. A description of each of the buttons is set forth in the following sections:

Select Domain: When this is selected the domain structure screen is presented (see FIG. 23).

All Goals View: when this button is clicked, the user is presented with screen (see FIG. 17) which repeats the hierarchy on the left and adds relevant information on the right in five categories useful to users when the users want to assess the validity of the current goal hierarchy, including cost, payback priority, domain, and due date (expressed as time remaining before expected completion). From this screen, the user can select other views where the hierarchy is sorted by category represented by the column heading, e.g., is sorted in descending order of costs, screen (see FIG. 17), thereby helping people decide whether the level of investment required can be afforded. Likewise, using column headings as buttons, the user can sort the hierarchy into various views according to payback (see FIG. 19), priority (see FIG. 19), domain (see FIG. 16), or due date. These views facilitate meetings and deliberations where users need to quickly produce a variety of sorted views to achieve the variety of perspectives needed to reach informed decisions. For example, a view sorted by payback, with cost information also visible, helps users decide whether the return on investment will be sufficient to justify financially.

Sorting by priority allows users to view the relative weightings that have been given to the goals and initiatives based on factors deemed important from a prioritization perspective. In a typical case, from a strategic perspective, the view sort by domain is highly desirable because this view shows how the goals and initiatives affect different aspects of the organization, e.g., from dealing with customers, to processes, organization, and economics. As a result, users can make common sense decisions about, for example, whether all the needed changes in all the domains have been accounted for.

Status View: this button takes the user to various views of the portfolio sorted by information fields that indicate how well the 15 goal or initiative is progressing. When the button is clicked, the Projects by Status screen (see FIG. 18) is presented, sorted by status categories and showing other column headings that can be clicked on to get Projects by Stage (see FIG. 20) or by Owner, Projects by Risk, and Projects by Due Date. Armed with these views, users can decide where to focus their attention to keep projects on track.

Alerts View: this button takes the user to the Project Alerts View (see FIG. 26) which shows changes a particular user has identified as being of particular interest. From this view, the user can access the Set Alerts and Set AlertsEdit screens and modify the goals and types of changes the computer is to monitor and flag on the user's behalf.

In a typical embodiment, the Agile Manager is accessible from every desktop, with appropriate security clearances, for individual or team use on-line, with print out ability for manual use, and for electronic projection to facilitate team meetings. The software is flexible and is arranged to allow the user to make non-structural changes in, for example, the specifics contained. The user changes the "base case" to reflect the desired language and sub-domain elements. As a result, the more the tool is used, the more the tool comes to reflect the user and the user tends to become proficient with the tool.

The technique (i.e., at least a portion of one or more of the procedures described above) may be implemented in hardware or software, or a combination of both. In some cases, it is advantageous if the method is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In some cases, it is advantageous if each program is implemented in a high level procedural or object-oriented programming language such as Microsoft C or C++ to communicate with a computer system. The programs can be implemented in assembly or machine language, if desired. In any case, the language may be a compiled or interpreted language.

In some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A system for supporting management of a collaborative activity by persons involved therein, the persons not being specialists in information technology, the system being implemented using a processor and a storage device accessible to the processor, and the system comprising:

a representation of a model of the collaborative activity in the storage device, the model of the collaborative activity including model entities, the model entities providing access to information concerning the collaborative activity, being organized into a plurality of hierarchies having a plurality of types, and a given model entity being capable of simultaneously belonging to a hierarchy having one of the types and a hierarchy having another of the types; and said processor being configured to provide a graphical user interface to a person of the persons for providing outputs to the person and responding to inputs from the person by performing operations on a model entity as limited by a type of access which the person has to the model entity, the operations including controlling access to the model entity, creating, modifying, and/or deleting the model entity, assigning the model entity to a location in a hierarchy, accessing and/or modifying the information concerning the collaborative activity via the model entity, viewing model entities as ordered by a hierarchy to which the entities belong, and viewing model entities as ordered by a value in the information concerning the collaborative activity to which the entities give access.

2. The system set forth in claim 1 wherein:
the model further includes representations of further information that are related to certain of the representations of the model entities; and
the graphical user interface further permits the person to access the representations of the related further information via the model entities to which the representations are related.

3. The system set forth in claim 2 wherein:
the graphical user interface further permits the person to modify the further information.

4. The system set forth in claim 3 wherein:
the further information is a document that is accessible to the system.

5. The system set forth in claim 3 wherein:
the further information is a message sent to the person by another person.

6. The system set forth in claim 4 wherein:
the further information is a discussion concerning the model entity among the persons.

7. A data storage device, the data storage device being characterized in that:
the data storage device contains a representation of a model of the collaborative activity in the storage device, the model of the collaborative activity including model entities, the model entities providing access to information concerning the collaborative activity, being organized into a plurality of hierarchies having a plurality of types, and a given model entity being capable of simultaneously belonging to a hierarchy having one of the types and a hierarchy having another of the types and a program which, when executed by the processor, provides a graphical user interface to a person of the persons for providing outputs to the person and responding to inputs from the person by performing operations on a model entity as limited by a type of access which the person has to the model entity, the operations including controlling access to the model entity, creating, modifying, and/or deleting the model entity, assigning the model entity to a location in a hierarchy, accessing and/or modifying the information concerning the collaborative activity via the model entity, viewing model entities as ordered by a hierarchy to which the entities belong, and viewing model entities as ordered by a value in the information concerning the collaborative activity to which the entities give access.

8. A method of supporting management of a collaborative activity by persons involved therein, the persons not being specialists in information technology and the method being performed in a system which includes a processor and a storage device accessible to the processor, the storage device containing a model of the collaborative activity, the model including representations of model entities, a given representation of a model entity being capable of simultaneously belonging to hierarchies including a hierarchy and another hierarchy, and the representations of model entities providing access to information relating to the collaborative activity, the processor providing an interface for a person of the persons, and the method comprising the steps performed in the system of:
receiving a definition of a model entity belonging to the model of the collaborative activity from a person of the persons via the interface and responding thereto by producing a representation of the model entity in the storage device; and
receiving a first indication of a first hierarchical relationship between the model entity and another model entity belonging to the hierarchy from the person via the interface and responding thereto by relating the model entity to the other model entity in the hierarchy and
receiving a second indication of a second hierarchical relationship between the model entity and a third model entity belonging to the other hierarchy from the person via the interface and responding thereto by relating the model entity to the third model entity in the other hierarchy.

9. The method set forth in claim 8 further comprising the step of:
receiving an indication from the person via the interface that one or the other of the hierarchical relationships is to be shown in the interface and responding thereto by showing the indicated relationship in the interface.

10. The method set forth in claim 8 wherein:
the hierarchy and the other hierarchy are different types of hierarchical relationships.

11. The method set forth in claim 10 wherein the method further comprises the steps of:
receiving a third indication from the person via the interface of the type of hierarchical relationship to be used in displaying the model entity in the interface; and
responding thereto by displaying the model entity in the interface using the indicated hierarchical relationship.

12. The method set forth in claim 9 wherein:
the indicated hierarchical relationship is shown in the interface by displaying model entities as sorted by the relationship.

13. The method set forth in claim 8 wherein the representation of the model entity includes a representation of information about the collaborative activity and
the method further comprises the steps of:
receiving a third indication of the model entity from the person via the interface;
receiving a fourth indication of the information from the person via the interface; and
responding thereto by producing the representation of the information in the interface as part of the representation of the model entity in the interface.

14. The method set forth in claim 13 further comprising the steps of:
receiving a fifth indication from the person via the interface that the information in the representation of the information in the representation of the model entity is to be displayed; and
responding thereto by showing the indicated information in the interface.

15. The method set forth in claim 13 further comprising the step of
receiving a sixth indication from the person via the interface that the information in the representation of the information in the representation of the model entity is to be modified; and
responding thereto by permitting the person to modify the information.

16. The method set forth in claim 13 further comprising the steps of:
receiving a sixth indication from the person via the interface that the model entities are to be sorted by values of the information in the representation of the information in the representation of the model entity; and
responding thereto by showing the sorted model entities in the interface.

17. The method set forth in claim 8 further comprising the steps of:
receiving a third indication from the person via the interface of a model entity;
receiving a fourth indication that further information is to be related to the indicated model entity; and
responding thereto by relating a representation of the further information to the representation of the indicated model entity.

18. The method set forth in claim 17 further comprising the steps of:
receiving a fifth indication from the person via the interface that the further information related to the model entity is to be displayed; and
responding thereto by showing the related further information in the interface.

19. The method set forth in claim 18 further comprising the steps of:
receiving a sixth indication from the person via the interface that the further information related to the model entity is to be modified; and
responding thereto by modifying the related further information.

20. A data storage device, the data storage device being characterized in that:
the data storage device contains a model of the collaborative activity, the model including representations of model entities, a given representation of a model entity being capable of simultaneously belonging to hierarchies including a hierarchy and another hierarchy, and the representations of model entities providing access to information relating to the collaborative activity and further contains a program which, when executed by a processor, implements a method of supporting management of a collaborative activity by persons involved therein, the persons not being specialists in information technology, comprising the steps of:
receiving a definition of a model entity belonging to the model of the collaborative activity from a person of the persons via the interface and responding thereto by producing a representation of the model entity; and
receiving a first indication of a first hierarchical relationship between the model entity and another model entity belonging to the hierarchy from the person via the interface and responding thereto by relating the model entity to the other model entity in the hierarchy and receiving a second indication of a second hierarchical relationship between the model entity and a third model entity belonging to the other hierarchy from the person via the interface and responding thereto by relating the model entity to the third model entity in the other hierarchy.

21. The system set forth in claim 1 wherein:
there is a plurality of types of model entities; and
the graphical user interface shows a model entity's type.

* * * * *

(12) POST-GRANT REVIEW CERTIFICATE (19th)
United States Patent
Beaven

(10) Number: US 8,095,413 J1
(45) Certificate Issued: Apr. 22, 2016

(54) PROCESSING MANAGEMENT INFORMATION

(75) Inventor: Douglas F. Beaven

(73) Assignee: VIRTUALAGILITY INC.

Trial Number:

CBM2013-00024 filed May 24, 2013

Petitioner: Salesforce.com, Inc.

Patent Owner: Virtualagility, Inc.

Post-Grant Review Certificate for:

Patent No.: 8,095,413
Issued: Jan. 10, 2012
Appl. No.: 09/312,740
Filed: May 14, 1999

The results of CBM2013-00024 are reflected in this post-grant review certificate under 35 U.S.C. 328(b).

POST-GRANT REVIEW CERTIFICATE
U.S. Patent 8,095,413 J1
Trial No. CBM2013-00024
Certificate Issued Apr. 22, 2016

AS A RESULT OF THE POST-GRANT REVIEW PROCEEDING, IT HAS BEEN DETERMINED THAT:

Claims 1-21 are cancelled.

\* \* \* \* \*